(12) United States Patent
Jamshidiat et al.

(10) Patent No.: US 9,174,739 B2
(45) Date of Patent: Nov. 3, 2015

(54) ACTIVE VIBRATION CONTROL SYSTEM

(71) Applicant: The Boeing Company, Chicago, IL (US)

(72) Inventors: Hamid Jamshidiat, Bellevue, WA (US); Laila M. Elias, Seattle, WA (US); Melvin Kosanchick, III, Redmond, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/468,706

(22) Filed: Aug. 26, 2014

(65) Prior Publication Data

US 2015/0197340 A1    Jul. 16, 2015

Related U.S. Application Data

(63) Continuation-in-part of application No. 14/153,238, filed on Jan. 13, 2014.

(51) Int. Cl.
| | |
|---|---|
| *B64D 27/26* | (2006.01) |
| *B64D 11/00* | (2006.01) |
| *F16F 7/10* | (2006.01) |
| *G10K 11/00* | (2006.01) |

(52) U.S. Cl.
CPC ............... *B64D 27/26* (2013.01); *B64D 11/00* (2013.01); *F16F 7/1005* (2013.01); *G10K 11/002* (2013.01)

(58) Field of Classification Search
CPC ...... B64D 27/26; B64D 11/00; G10K 11/002; F16F 7/1005
USPC .......................................................... 701/3
See application file for complete search history.

(56) References Cited

U.S. PATENT DOCUMENTS

| | | | |
|---|---|---|---|
| 5,018,698 | A | 5/1991 | Tobias |
| 5,049,768 | A | 9/1991 | Andersson |
| 5,065,959 | A | 11/1991 | Bhatia et al. |
| 5,233,540 | A | 8/1993 | Andersson et al. |
| 5,568,557 | A | 10/1996 | Ross et al. |

(Continued)

FOREIGN PATENT DOCUMENTS

| | | |
|---|---|---|
| DE | 102010021867 | 12/2011 |
| EP | 0455355 | 6/1991 |

(Continued)

OTHER PUBLICATIONS

International Search Report, International Application No. PCT/US2014/059831, dated Jan. 8, 2015.

(Continued)

*Primary Examiner* — Mary Cheung
*Assistant Examiner* — Anne Mazzara
(74) *Attorney, Agent, or Firm* — Perman & Green, LLP

(57) ABSTRACT

An active vibration control system includes a plurality of actuators corresponding to and disposed adjacent each engine of an aircraft, at least one sensor located within a passenger cabin of the aircraft and configured to detect a magnitude and frequency of one or more of vibration and sound produced by a respective engine and generate one or more of a vibration and sound feedback signal, and a controller connected to each of the plurality of actuators and each of the at least one sensor, the controller being configured to effect control of no more than two of the plurality of actuators for a respective engine based the feedback signal where the no more than two actuators effect suppression of one or more of vibration and sound of a respective engine due to rotating axis of the respective engine.

20 Claims, 16 Drawing Sheets

(56) References Cited

U.S. PATENT DOCUMENTS

| | | | |
|---|---|---|---|
| 5,845,236 | A | 12/1998 | Jolly et al. |
| 6,974,006 | B2 | 12/2005 | Ruckman et al. |
| 7,665,708 | B2 | 2/2010 | Stothers et al. |
| 8,439,299 | B2 | 5/2013 | Luo et al. |
| 2011/0089308 | A1* | 4/2011 | Fursdon .................. 248/550 |
| 2013/0001841 | A1 | 1/2013 | Haynes et al. |

FOREIGN PATENT DOCUMENTS

| | | |
|---|---|---|
| EP | 0786131 | 10/1995 |
| EP | 0786057 | 12/1999 |
| EP | 2650215 | 10/2013 |
| GB | 2346426 | 9/2000 |
| WO | 9534769 | 12/1995 |
| WO | 0259497 | 1/2002 |
| WO | 2009055007 | 4/2009 |
| WO | 2010104508 | 9/2010 |

OTHER PUBLICATIONS

European Search Report, European Application No. 14187053, dated May 13, 2015.

\* cited by examiner

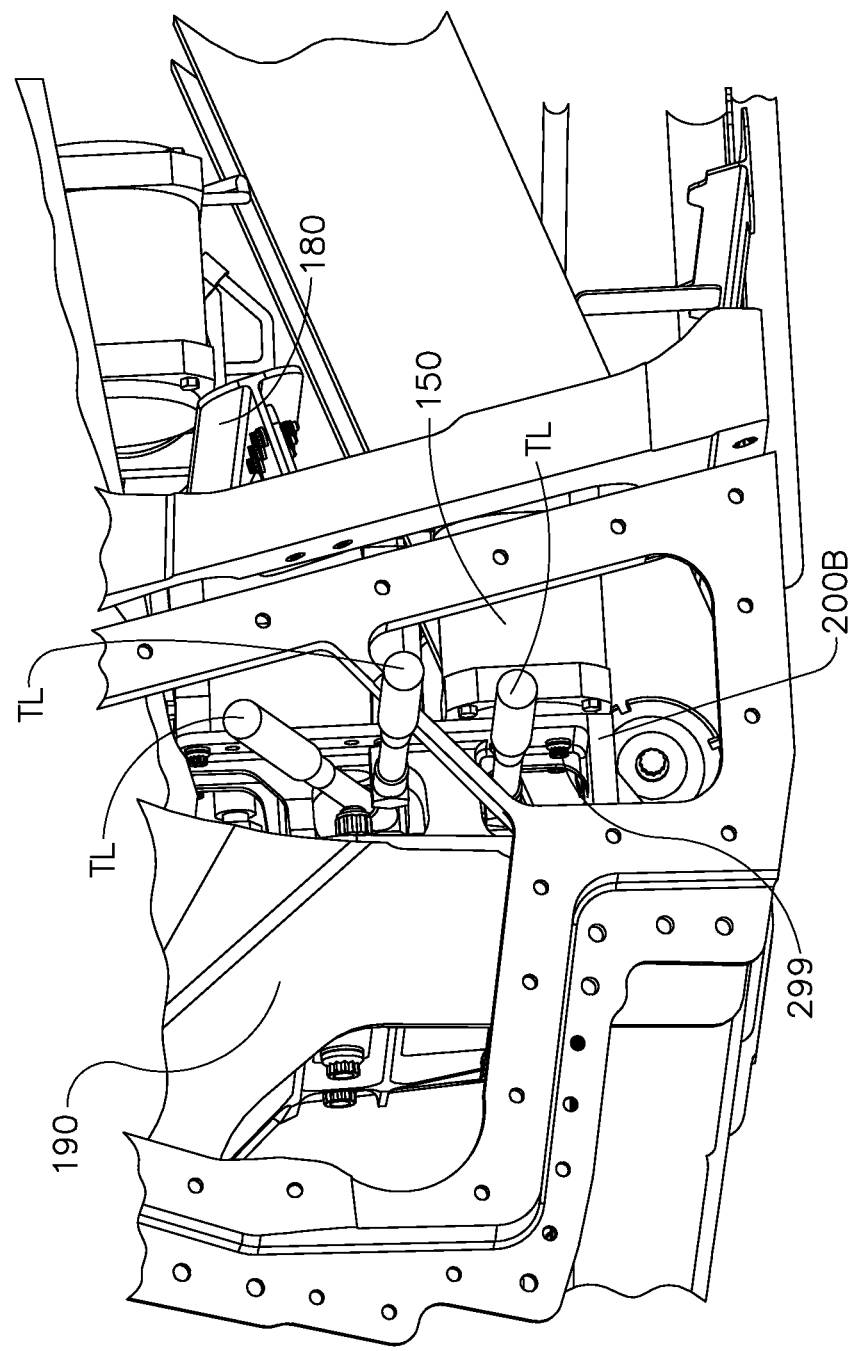

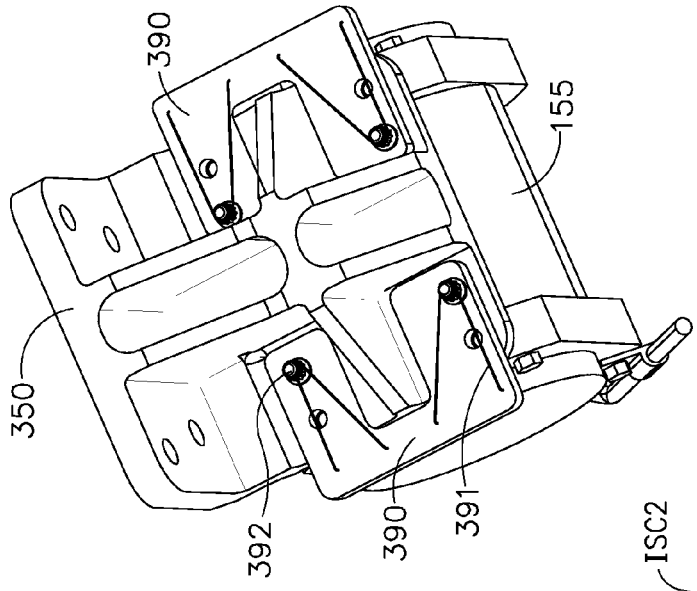
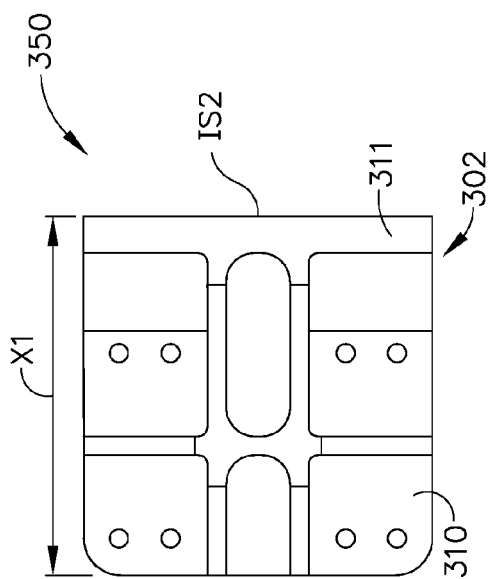
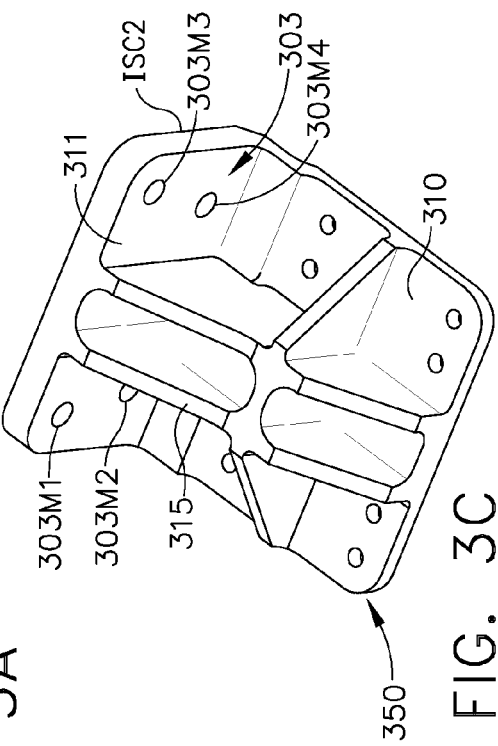
FIG. 3B
FIG. 3A
FIG. 3C

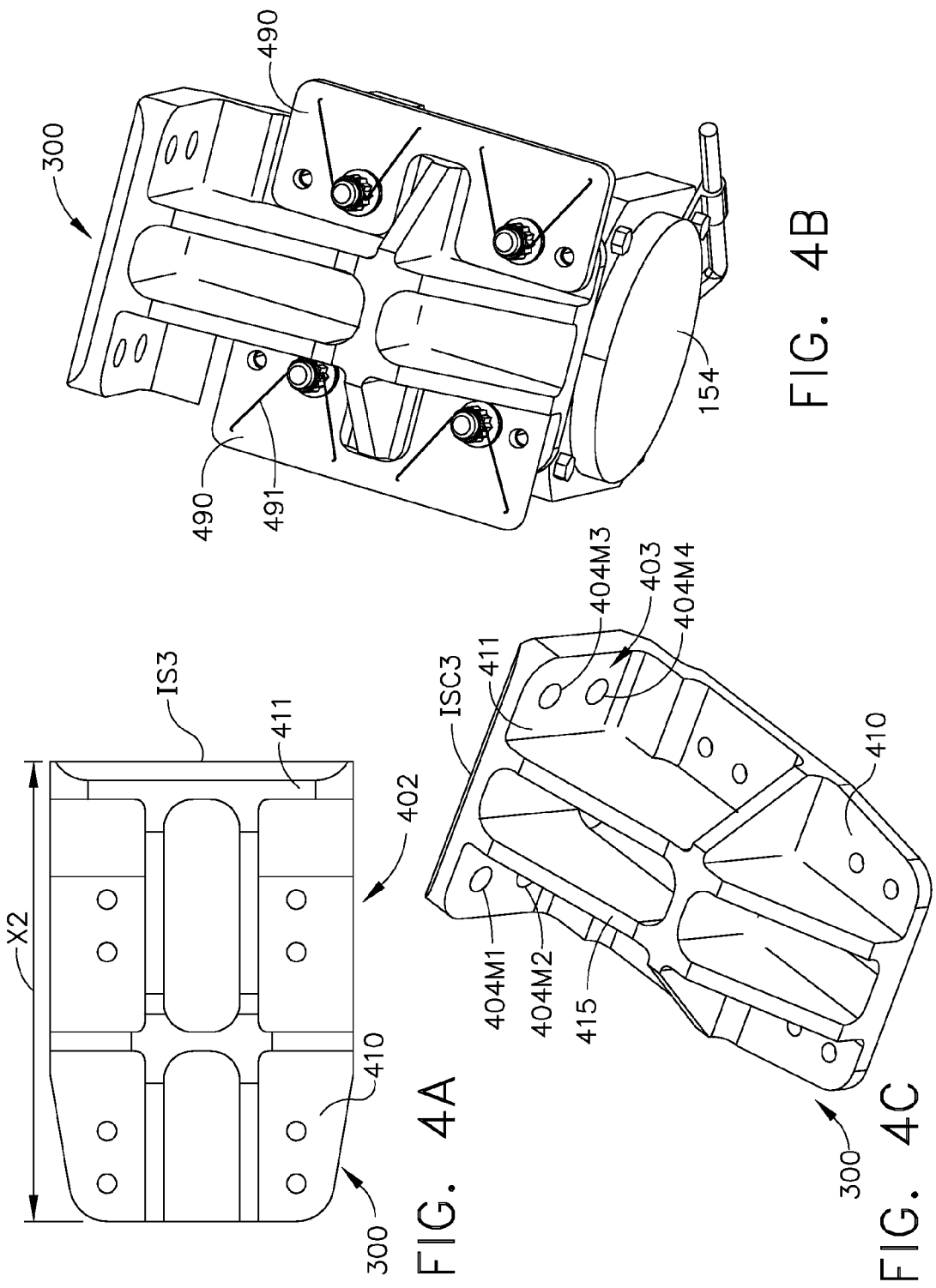

ACTIVE VIBRATION CONTROL SYSTEM

CROSS-REFERENCE TO RELATED APPLICATIONS

This application is a continuation-in-part of and claims the benefit of U.S. patent application Ser. No. 14/153,238 filed on Jan. 13, 2014, the disclosure of which is incorporated by reference herein in its entirety.

BACKGROUND

1. Field

The exemplary embodiments generally relate to active vibration control and, more particularly, to actuator mounting brackets for active vibration control systems.

2. Brief Description of Related Developments

Generally active vibration control systems in aircraft use shakers or actuators (e.g. active vibration elements) to vibrate a structural component at a discrete frequency to cancel the input disturbance (noise/sound and/or vibration), solely related to rotating axis of an aircraft engine. These actuators are mounted to a portion of the aircraft using brackets that generally do not provide easy installation or removal of the actuators and/or brackets especially in retrofit applications.

It would be advantageous to have an active vibration control system actuator mounting bracket that provides substantially unhindered installation and removal of the actuators.

SUMMARY

In one aspect of the disclosed embodiment an active vibration control system includes a plurality of actuators corresponding to and disposed adjacent each engine of an aircraft; at least one sensor located within a passenger cabin of the aircraft and configured to detect a magnitude and frequency of one or more of vibration and sound produced by a respective engine and generate one or more of a vibration and sound feedback signal; and a controller connected to each of the plurality of actuators and each of the at least one sensor, the controller being configured to effect control of no more than two of the plurality of actuators for a respective engine based the feedback signal where the no more than two actuators effect suppression of one or more of vibration and sound of a respective engine due to a rotating axis of the respective engine.

In another aspect of the disclosed embodiment a method for reducing one or more of sound and vibration in the passenger cabin of an aircraft having at least one engine is provided. The method includes providing feedback signals to a controller with one or more sensors located within the passenger cabin; and actuating, with the controller, no more than two of a plurality actuators for each engine based on the feedback signal to effect suppression of one or more of the sound and vibration generated by a respective engine.

In yet another aspect of the disclosed embodiment an active vibration control system includes a first actuator and a second actuator disposed on each engine mounting structure of a 737NG aircraft; at least one sensor corresponding to one or more of the first actuator and the second actuator, each of the at least one sensor being configured to detect at least a magnitude and frequency of engine vibrations and being disposed within a passenger cabin of the aircraft, and outside the passenger cabin of the aircraft adjacent a respective engine; and a controller connected to the at least one sensor, the first actuator and the second actuator, where the controller is configured to effect control of the first and second actuator based on feedback signals from the at least one sensor, and suppression of one or more of engine sound and engine vibration.

In still another aspect of the disclosed embodiment a Boeing 737NG active vibration control system includes a first and second actuator configured to interface with a Boeing 737NG frame adjacent each engine; at least one sensor arranged within a cabin of the Boeing 737NG and configured to generate feedback signals from sensing excitations of the Boeing 737NG frame; and a controller configured to command operation of the first and second actuator in response to the feedback signal, where operation of the actuators suppresses vibrations and sounds produced by each engine.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The foregoing aspects and other features of the disclosed embodiment are explained in the following description, taken in connection with the accompanying drawings, wherein:

FIGS. 2A, 2B, 2C and 2D are schematic illustrations of an actuator mounting bracket in accordance with aspects of the disclosed embodiment;

FIGS. 3A, 3B and 3C are schematic illustrations of an actuator mounting bracket in accordance with aspects of the disclosed embodiment;

FIGS. 4A, 4B and 4C are schematic illustrations of an actuator mounting bracket in accordance with aspects of the disclosed embodiment;

Figure 10:
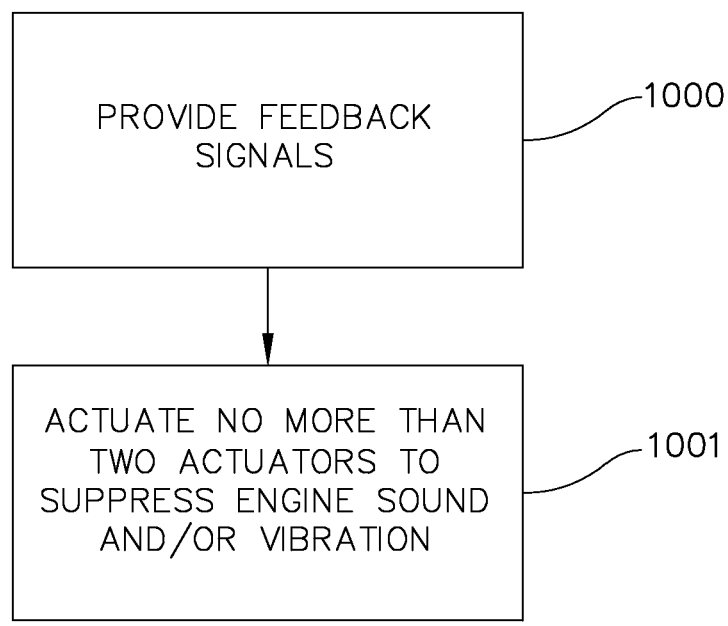

8A-8C are exemplary graphs of sound reduction for a sensor and actuator combination in accordance with aspects of the disclosed embodiment;

9A-9C are exemplary graphs of sound reduction for a sensor and actuator combination in accordance with aspects of the disclosed embodiment; and FIG. 10 is a flow diagram in accordance with aspects of the disclosed embodiment.

DETAILED DESCRIPTION

FIG. 1 is a schematic illustration of a fixed wing aircraft 100 incorporating aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

In one aspect the aircraft 100 may be a Boeing 737 and in particular a Boeing 737NG. Generally an active vibration control system 110 may be used on the aircraft 100 to reduce engine vibrations and/or sound. The active vibration control system 110 may include any suitable sensors 650 (FIG. 5A) for sensing noise/sound and/or vibration from e.g. aircraft engines 102 mounted to the wings 101 and/or fuselage 104 of the aircraft 100. The active vibration control system 110 may also include one or more actuators 150-155 (FIG. 1C) for inducing counteracting vibrations for reducing or otherwise cancelling the structure-borne noise and/or vibration that is transmitted from the engines 102 into the cabin 100C of the aircraft 100. The use of active vibration control systems may, for example, improve ride comfort, reduce costs of engine balancing, and improve fuel burn. As may be realized the sensors 650 and actuators 150-155 may be connected to any suitable controller 500 (FIG. 5A) for controlling the vibrational force generated by the actuators based on signals (e.g. feedback) from the sensors 650 where the signals correspond to the noise and/or vibration of the engines 102. As will be described in greater detail below, as few as two actuators and corresponding sensors may effect active vibration control in accordance with the aspects of the disclosed embodiment.

Figure 1A:
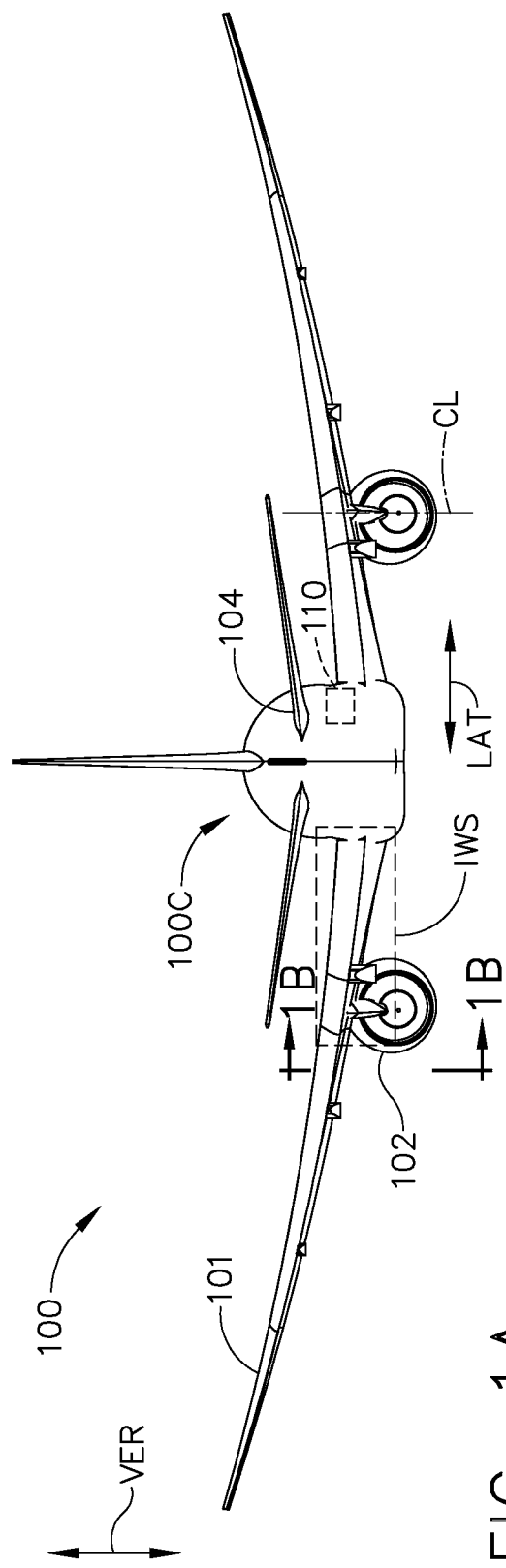
FIG. 1A is a schematic illustration of a fixed wing aircraft incorporating aspects of the disclosed embodiment.
Figure 1B:
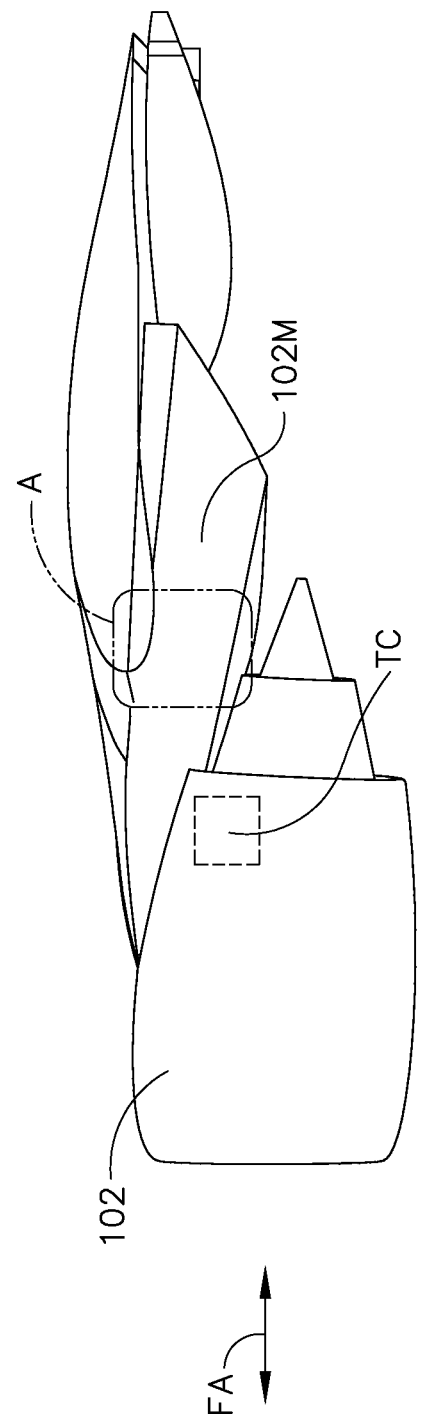
FIG. 1B is a schematic illustration of a portion of the fixed wing aircraft of FIG. 1A.

Referring also to FIG. 1B, as may be realized, the engines 102 are mounted to any suitable portion of the aircraft, such as the wings 101 or fuselage 104, using any suitable engine mounting structure 102M. The aspects of the disclosed embodiment described herein includes active vibration control actuator mounting brackets configured to mount one or more actuators 150-155 to the engine mounting structure 102M. The brackets may be dynamically tuned such that their modes of vibration are outside the actuator frequency of operation. The brackets may also be designed or otherwise configured for loads induced by the actuators 150-155 and for mounting of the brackets and actuators to an existing aircraft structure, such as e.g. the engine mounting structure 102M, with minimal modifications to the aircraft structure while allowing for easy or otherwise unhindered access to the actuators 150-155 for installation and/or removal of the actuators 150-155 for any suitable purpose while respective brackets remain installed or otherwise affixed to the aircraft structure. As such, the brackets described herein may be configured for retrofitting an active vibration control system to an aircraft where the brackets are provided individually or as a kit.

Figure 1C:
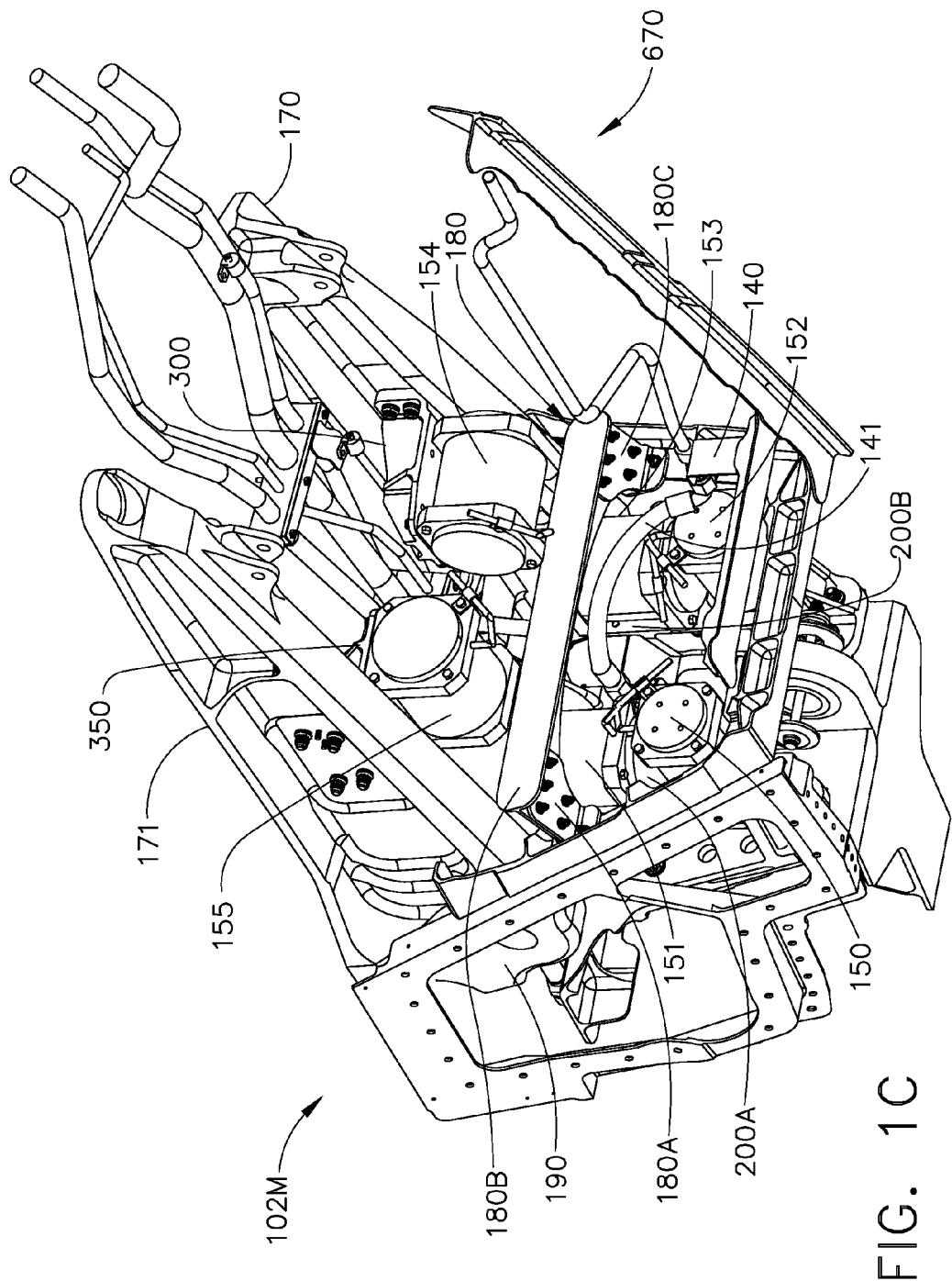
FIGS. 1C-1E are schematic illustrations of actuator mountings in the aircraft of FIG. 1A in accordance with aspects of disclosed embodiment.
Figure 1D:
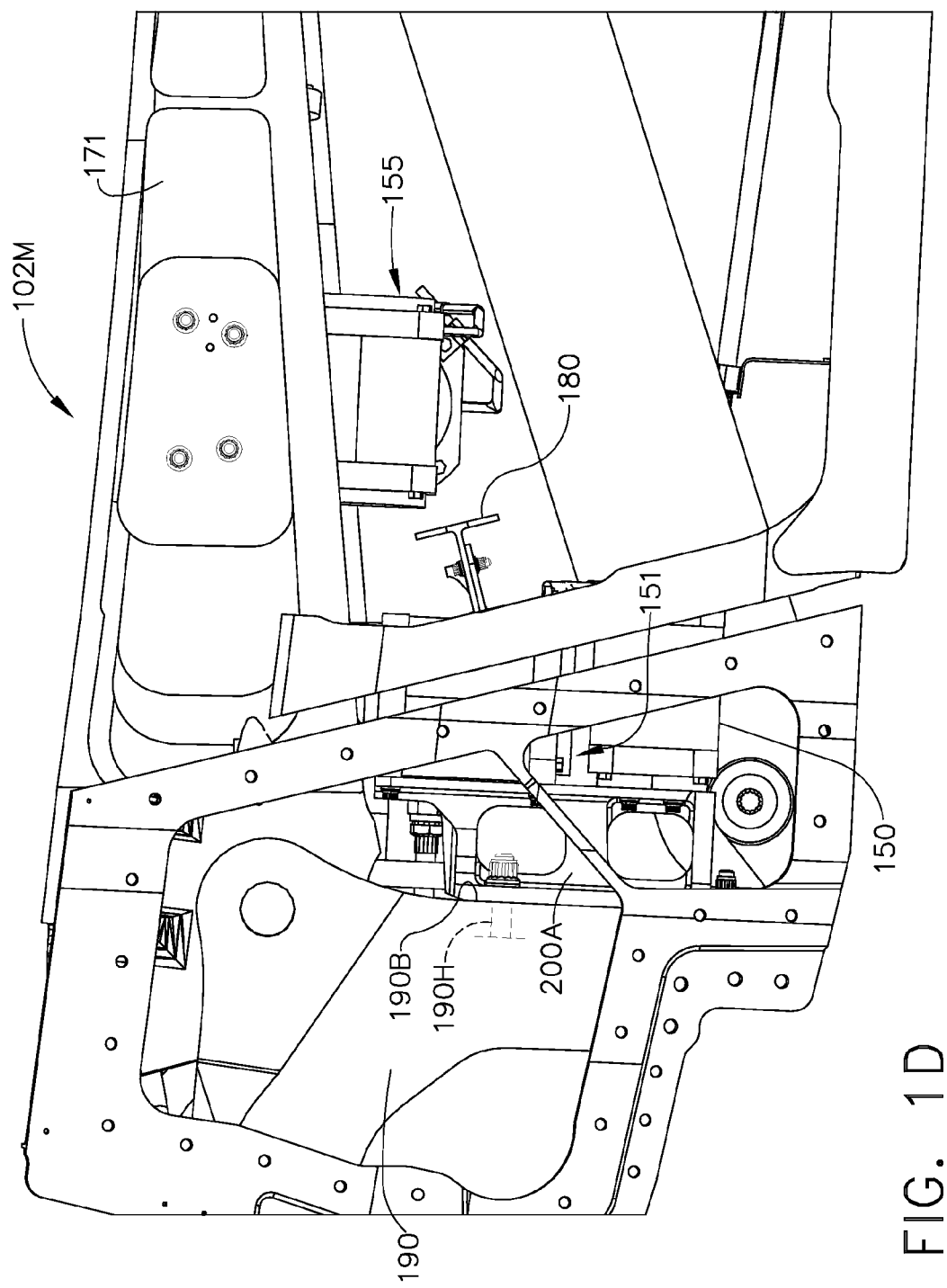
Figure 1E:
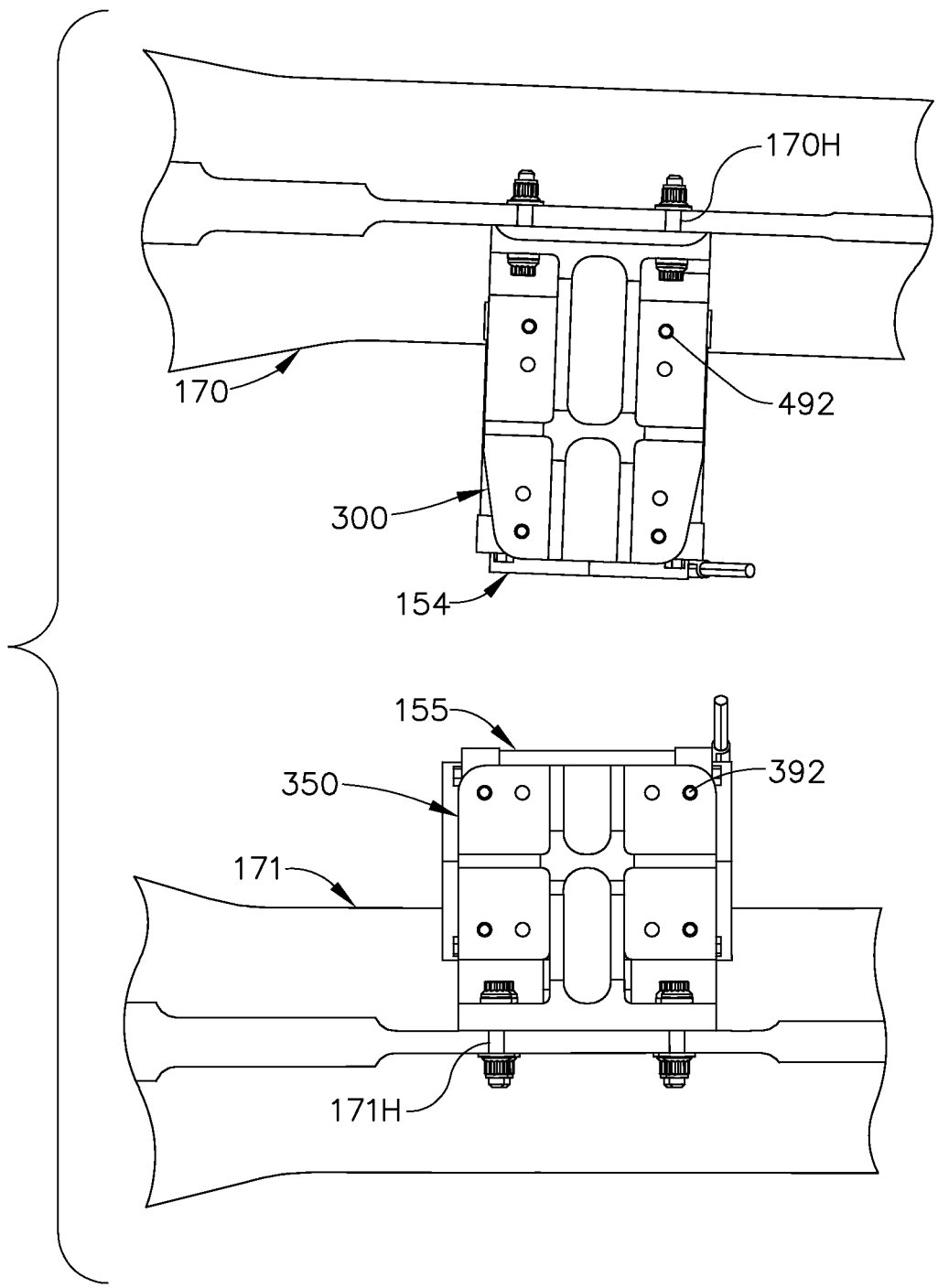
Figure 2A:
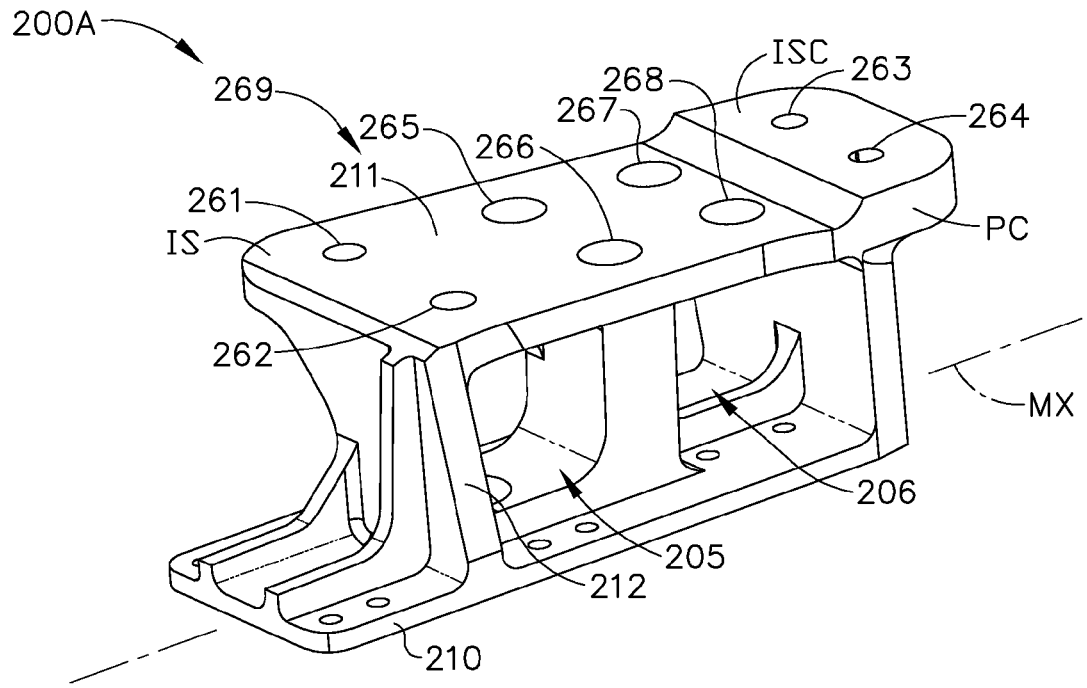
Figure 2B:
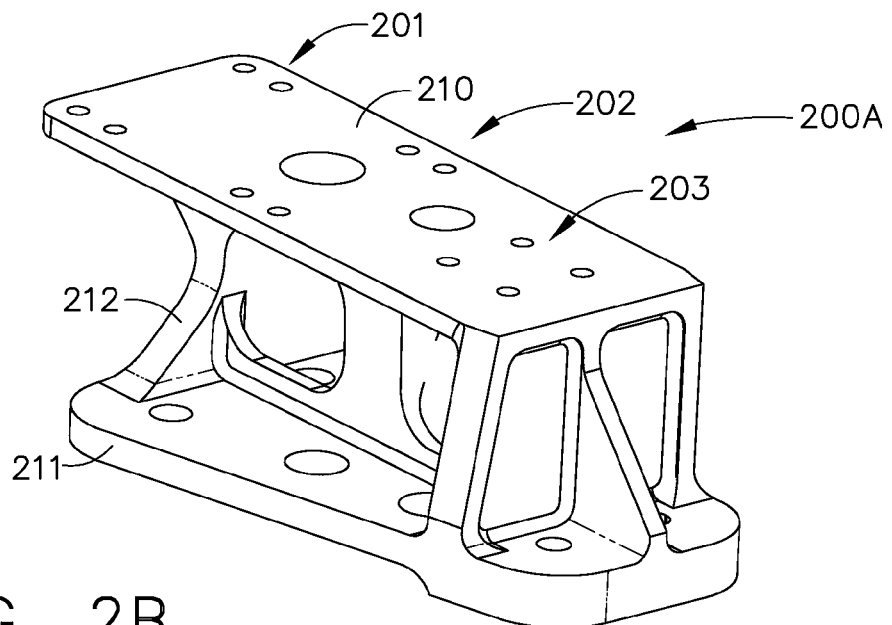
Figure 2D:
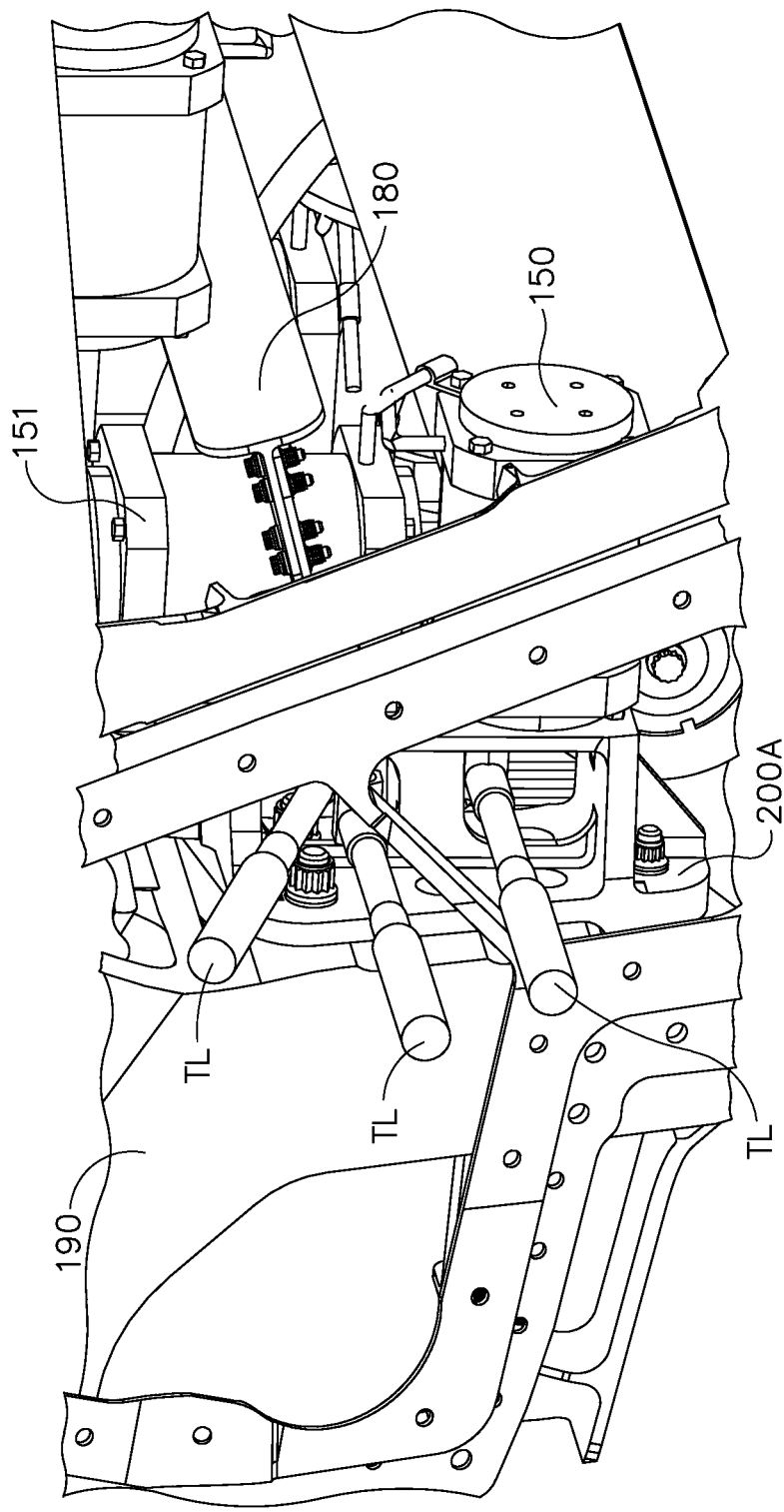

Referring also to FIGS. 1C-1E one or more actuator mounting brackets 200A, 200B, 300, 350 are illustrated as being mounted to the engine mounting structure 102M. In this aspect the engine mounting structure includes an inboard wing fitting 170, an outboard wing fitting 171 and an engine strut 190 having an engine strut aft bulkhead 190B. One or more actuator brackets 200A, 200B may be mounted to the aft engine strut bulkhead and one or more brackets 300, 350 may be mounted to the inboard and/or outboard wing fittings 170, 171. In other aspects the actuator brackets 200A, 200B, 300, 350 may be mounted to any suitable structure or components of the engine mounting structure 102M. In this aspect each bracket 200A, 200B is configured for mounting two actuators (e.g. actuators 150, 151 are mounted to bracket 200A and actuators 152, 153 are mounted to bracket 200B) while each of the brackets 300, 350 are configured for mounting a single actuator (e.g. actuator 154 is mounted to bracket 300 and actuator 155 is mounted to bracket 350). In other aspects each of the brackets 200A, 200B, 300, 350 may be configured such that any suitable number of actuators can be mounted to a respective bracket. As may be realized, each bracket may be configured to mount the respective actuators in a predetermined orientation relative to the axes (e.g. fore/aft axis—see arrow FA in FIG. 1B, inboard/outboard or lateral axis—see arrow LAT in FIG. 1A and top/bottom or vertical axis—see arrow VER in FIG. 1A) of the aircraft 100 for counteracting vibrations/noise along one or more of these axes as will be described below to provide vibration/noise cancellation and/or suppression in any suitable number of degrees of freedom such as, for example, six degrees of freedom. Here six actuators 150-155 are mounted to their respective brackets 200A, 200B, 300, 350 adjacent the engine 102 for applying vibration cancellation/suppression to reduce vibration and noise sensed in the cabin. In other aspects any suitable number of actuators may be used. It is noted that each engine 102 of the aircraft may include brackets and actuators having an arrangement substantially similar to that shown and described herein. In one aspect, the brackets 200A, 200B, 300, 350 may provide a modular active vibration control mounting system such that each bracket is configured for mounting of actuators to the bracket in one or more of the predetermined orientations described above. One or more of the brackets 200A, 200B, 300, 350 may be mounted to the engine mounting structure to cancel or reduce vibrations along any desired axis. It is noted that one or more of the brackets 200A, 200B, 300, 350 may provide actuator mounting along one or more common axes so that the actuator forces may be combined for countering vibrational forces of, for example, a respective engine 102 along or on different portions of the engine mounting structure. For example, as can be seen in FIG. 1C brackets 200A, 200B provide mounting of actuators along one or more of the fore/aft and vertical axes, bracket 300 provides actuator mounting along the lateral axis and bracket 350 provides actuator mounting along the fore/aft axis. In one aspect, bracket 300 may be mounted to the outboard wing fitting 171 and bracket 350 may be mounted to the inboard wing fitting 170 for changing a force application location of their respective actuators. In other aspects one of a bracket 350 may be mounted to each of the inboard and outboard wing fitting 170, 171 for providing an actuator force application in the fore/aft direction to each of the wing fittings 170, 171. In still other aspects one of a bracket 300 may be mounted to each of the inboard and outboard wing fitting 170, 171 for providing an actuator force application in the lateral direction to each of the wing fittings 170, 171. As may be realized, while each bracket 200A, 200B is configured to hold two actuators, each along a different axis (e.g. in this example, along the vertical and fore/aft axes) in other aspects, only one actuator may be mounted to the bracket 200A, 200B along, e.g., one of the vertical or fore/aft axes leaving the other mounting location empty.

Referring now to FIGS. 1D, 2A, 2B, 2C and 2D the bracket 200A will be described. It is noted that the bracket 200B is substantially similar to bracket 200A however, the features of bracket 200B may be mirrored about axis MX to form inboard (e.g. bracket 200B) and outboard (e.g. bracket 200A) brackets that substantially follow a contour of the engine strut aft bulkhead 190B, where the terms inboard and outboard refer to the position of the brackets relative to the engine centerline CL (FIG. 1A) and the fuselage (e.g. the locations between the centerline CL and the fuselage may be referred to as inboard and locations on the opposite side of the centerline CL may be referred to as outboard). In one aspect the bracket 200A, 200B includes actuator mounting member 210 and a bulkhead interface member 211 connected to the actuator interface member 210 by a connecting member 212. The actuator mounting member 210, bulkhead interface member 211 and connecting member 212 may be integrally formed as a unitary one piece member. In one aspect the actuator interface member 210 may be substantially parallel with the bulkhead interface member 211 while in other aspects, the actuator interface member 210 and the bulkhead interface member 211 may have any suitable spatial arrangement relative to one another. The actuator interface member 210 may include one or more hole patterns 201, 202, 203 configured for mounting one or more actuators to the bracket 200A, 200B. In this aspect one or more holes from hole patterns 201, 202 may be used for mounting actuator 151, 153 to the bracket 200A, 200B along the top/bottom or vertical axis while one or more holes of hole pattern 203 may be used for mounting actuator 150, 152 along the fore/aft axis. In other aspects the actuators may be mounted in any suitable arrangement along any suitable axes of the aircraft 100. The hole patterns 201, 202, 203 may have any suitable number of holes with any suitable spacing corresponding to the mounting holes of the respective actuators. The bulkhead interface member 211 may include any suitable peripheral contour PC so that a hole pattern 269 (e.g. including mounting holes 261-264 and clearance holes 265-268) may be included in the bulkhead interface member 211. In one aspect the mounting holes 261-264 may be positioned on the bulkhead interface member 211 so that the mounting holes 261-264 are arranged to match existing fastener holes 190H (FIG. 1D) of the engine strut 190. Here the existing fastener holes 190H may be used for mounting the bracket 200A, 200B to the engine strut aft bulkhead 190B. In other aspects mounting holes may be added as desired in the engine strut 190 for mounting the bracket 200A, 200B. Any suitable clearance holes or recesses 265-268 may also be provided in the bulkhead interface member 211 so that the bracket 200A may be installed over existing fasteners included in the engine strut 190 so that active vibration control may be retrofitted to, for example, the aircraft 100 such as, for example, the Boeing 737NG. As may be realized the bulkhead interface member 211 may also include any suitable interface surface contour ISC so that the interface surface IS of the bulkhead interface member 211 substantially corresponds to and is in substantially contact with a mounting surface of the engine strut aft bulkhead 190B again allowing retrofitting of active vibration control to the aircraft 100. The connecting member 212 may include one or more apertures 205, 206 configured to allow tool TL access to each fastener 299 that fastens or otherwise secures each actuator 150, 151, 152, 153 to the respective bracket 200A, 200B while the bracket 200A, 200B remains affixed to the engine strut 190.

Referring now to FIGS. 1E and 3A-3C outboard bracket 350 includes an actuator interface member 310 and a wing fitting interface member 311. In this aspect the actuator interface member 310 and wing fitting interface member 311 may be of unitary one piece construction and have a substantially "L" shaped cross section (e.g. the actuator interface member 310 and wing fitting interface member 311 are substantially perpendicular or arranged at a non-zero angle relative to one another). Any suitable stiffening/reinforcing members 315 may be provided between and connect the actuator interface member 310 and a wing fitting interface member 311. The actuator interface member 310 may include any suitable hole pattern 302 that substantially corresponds to a mounting hole pattern of the actuator 155 for mounting or otherwise affixing the actuator 155 to the bracket 350 so that the actuator is oriented along the fore/aft axis. In other aspects the bracket 350 may be configured to mount the actuator along any suitable axis of the aircraft 100. In one aspect locking members 390 may be provided where the locking members 390 are configured for anchoring of anti-rotation locking cables 391. For example, fasteners 392 used to affix the actuator 155 to the bracket 350 may also secure a respective locking member 390 to the bracket 350. One or more anti-rotation locking cables 391 may pass through the fastener 392 and the ends of the one or more anti-rotation locking cables 391 may be anchored to the respective locking member 390 for substantially preventing rotation of the fasteners 392. The locking members 390 may have any suitable shape and/or configuration, such as the "U" shaped configuration illustrated in the figures so that the locking member 390 can be mounted to the bracket 350 substantially without interference with the actuator interface member 310, the wing fitting interface member 311 and the stiffening/reinforcing members 315. The wing fitting interface member 311 may include a hole pattern 303 including mounting holes 303M1-303M4. In one aspect the mounting holes 303M1-303M4 may be positioned on the wing fitting interface member 311 so that the mounting holes 303M1-303M4 are arranged to match existing fastener holes 171H (FIG. 1E) of the outboard wing fitting 171. Here the existing fastener holes 171H may be used for mounting the bracket 350 to the wing fitting 171. In other aspects mounting holes may be added as desired in the wing fitting 171 for mounting the bracket 350. Any suitable clearance holes or recesses (not shown) may also be provided in the wing fitting interface member 311. As may be realized, the bracket 350 may be installed over existing fasteners and using existing holes included in the wing fitting 171 (or in other aspects holes may be added as desired) so that active vibration control may be retrofitted to, for example, the aircraft 100 such as, for example, the Boeing 737NG. As may also be realized, the wing fitting interface member 311 may also include any suitable interface surface contour ISC2 so that the interface surface IS2 of the wing fitting interface member 311 substantially corresponds to and is in substantially contact with a mounting surface of the wing fitting 171 again allowing retrofitting of active vibration control to the aircraft 100.

Referring now to FIGS. 1E and 4A-4C inboard bracket 300 may be substantially similar to the outboard bracket 350 described above. However, in one aspect the outboard bracket 350 may have an actuator interface member 310 with a length X1 (FIG. 3A) and inboard bracket 300 may have an actuator interface member 410 having a length X2 (and an actuator mounting hole pattern 402 that is different than the hole pattern 302). This difference in configuration between bracket 300 and bracket 350 may allow for mounting of the respective actuators 154, 155 in differing orientations (e.g. actuator 155 may be mounted in one of a fore/aft orientation, lateral orientation or vertical orientation while actuator 154 is mounted in a different one of the fore/aft orientation, lateral orientation or vertical orientation) to counteract engine vibrations along the fore/aft and lateral directions. In other aspects the inboard bracket 300 and outboard bracket 350 may be configured for mounting the respective actuators along the same axis (e.g. both brackets are configured to mount their respective actuators in one of the fore/aft axis, lateral axis or vertical axis).

In accordance with an aspect of the disclosed embodiment the inboard bracket 300 includes an actuator interface member 410 and a wing fitting interface member 411. In this aspect the actuator interface member 410 and wing fitting interface member 411 may be of unitary one piece construction and have a substantially "L" shaped cross section (e.g. the actuator interface member 410 and wing fitting interface member 411 are substantially perpendicular or arranged at a non-zero angle relative to one another). Any suitable stiffening/reinforcing members 415 may be provided between and connect the actuator interface member 410 and a wing fitting interface member 411. The actuator interface member 410 may include any suitable hole pattern 402 that substantially corresponds to a mounting hole pattern of the actuator 154 for mounting or otherwise affixing the actuator 154 to the bracket 300. In one aspect locking members 490 may be provided where the locking members 490 are configured for anchoring of anti-rotation locking cables 491. For example, fasteners 492 used to affix the actuator 154 to the bracket 300 may also secure a respective locking member 490 to the bracket 300. One or more anti-rotation locking cables 491 may pass through the fastener 492 and the ends of the one or more anti-rotation locking cables 491 may be anchored to the respective locking member 490 for substantially preventing rotation of the fasteners 492. The locking members 490 may have any suitable shape and/or configuration, such as the "U" shaped configuration illustrated in the figures so that the locking member 490 can be mounted to the bracket 300 substantially without interference with the actuator interface member 410, the wing fitting interface member 411 and the stiffening/reinforcing members 415. The wing fitting interface member 411 may include a hole pattern 403 including mounting holes 404M1-404M4. In one aspect the mounting holes 404M1-404M4 may be positioned on the wing fitting interface member 411 so that the mounting holes 404M1-404M4 are arranged to match existing fastener holes 170H (FIG. 1E) of the inboard wing fitting 170. Here the existing fastener holes 170H may be used for mounting the bracket 300 to the wing fitting 170. In other aspects mounting holes may be added as desired in the wing fitting 170 for mounting the bracket 300. Any suitable clearance holes or recesses (not shown) may also be provided in the wing fitting interface member 411. As may be realized, the bracket 300 may be installed over existing fasteners and using existing holes included in the wing fitting 170 (or in other aspects holes may be added as desired) so that active vibration control may be retrofitted to, for example, the aircraft 100 such as, for example, the Boeing 737NG. As may also be realized, the wing fitting interface member 411 may also include any suitable interface surface contour ISC3 so that the interface surface IS3 of the wing fitting interface member 411 substantially corresponds to and is in substantially contact with a mounting surface of the wing fitting 170 again allowing retrofitting of active vibration control to the aircraft 100.

In one aspect the combined stiffness and the mass of each bracket 200A, 200B, 300, 350 may be tuned so that the lowest modal frequency (fundamental mode) of the bracket 200A, 200B, 300, 350 is outside of the actuator operational frequency (which may correspond to a spool of the engine 102) by any suitable amount such as, for example, a factor of two. For example, in one aspect the engine 102 may include shaft spools (speeds) corresponding to low pressure, medium pressure and high pressure compressors (that may respectively be referred to as N1, N2 and N3 spools). In other aspects the engine may include more or less than three spools and the brackets may be tuned to so that the first modal frequency of each bracket is outside the highest frequency range of one or more of the spools. The actuators 150-155 may be configured to counter the vibration/noise of more than one spool (such as for example, the N1, N2 and/or the N3 spools). In one aspect each bracket 200A, 200B, 300, 350 may be configured such that lowest modal frequency of the bracket is outside a predetermined frequency by any suitable margin (such as a factor of two) where the predetermined frequency is, for example, the actuator operational frequency/spool frequency (e.g. corresponding to one or more of the N1, N2 and N3 engine shaft speeds) which in one aspect, for the N2 spool, is about 160 Hz. For example, the brackets 200A, 200B, 300, 350 may have a lowest modal frequency of about 320 Hz or above with respect to cancelling N2 noise/vibration. In other aspects, the brackets 200A, 200B, 300, 350 may have any suitable frequency higher than the actuator/engine spool frequency. As may be realized, the brackets 200A, 200B, 300, 350 may be common brackets with respect to actuators that are configured cancellation of vibrations/noise produced by the N1, N2 and N3 spools in that the brackets may remain fixed to the aircraft structure regardless of whether the actuator(s) mounted to a respective bracket are configured to counteract the N1 and/or N2 spools. As may be realized, each bracket 200A, 200B, 300, 350 may also be configured to withstand static loads and fatigue induced in the bracket by the actuators or other forces exerted on the aircraft 100.

As described above, the active vibration control brackets 200A, 200B, 300, 350 in accordance with the aspects of the disclosed embodiment are configured so that active vibration control can be retrofit to an existing aircraft 100 with minimal or substantially no modifications to the aircraft while providing substantially unhindered installation and removal access to each actuator mounted to the brackets 200A, 200B, 300, 350. As described above, existing fastener or other holes located in, for example, the engine mounting structure may be used for mounting of one or more of the brackets 200A, 200B, 300, 350 with minimal modification to existing aircraft engine mounting structure (e.g. where "minimal modification" is defined as redirecting a hose and replacing a T-stiffener of the engine mounting structure). In one aspect minor modifications may be provided with one or more of the brackets 200A, 200B, 300, 350 to allow the retrofit of the active vibration control. For example, referring again to FIG. 1C, one or more suitable mounting brackets/fixtures 140 may be provided to redirect one or more fluid hoses 141 around the brackets 200A, 200B, 300, 350 and/or actuators 150-155. The mounting brackets/fixtures 140 may also be configured, in a manner similar to that described above, so that the mounting brackets/fixtures 140 use existing holes in the engine mounting structure for mounting the mounting brackets/fixtures 140 to the engine structure. In other aspects, holes may be added to the engine structure as desired for mounting the mounting brackets/fixtures 140 and redirecting the fluid hoses. Suitable stiffening members of the engine mounting structure may also be provided. For example, a retrofit T-stiffener 180 may be provided to replace an original equipment T-stiffener used to stiffen the engine mounting structure. In one aspect the retrofit T-stiffener 180 may be configured to provide clearance for and access to the actuators 150-155 and/or brackets 200A, 200B, 300, 350. In one aspect the retrofit T-stiffener 180 may have any suitable shape and/or configuration and may be provided as a unitary one piece member or as component parts 180A, 180B, 180C that are fastened together in any suitable manner. In one aspect, a retrofit kit may be provided for retrofitting an active vibration control system to an existing aircraft 100 where the retrofit kit includes one or more of the brackets 200A, 200B, 300, 350, one or more hose relocation brackets/fixtures 140 and any suitable stiffening members 180.

Figure 5A:
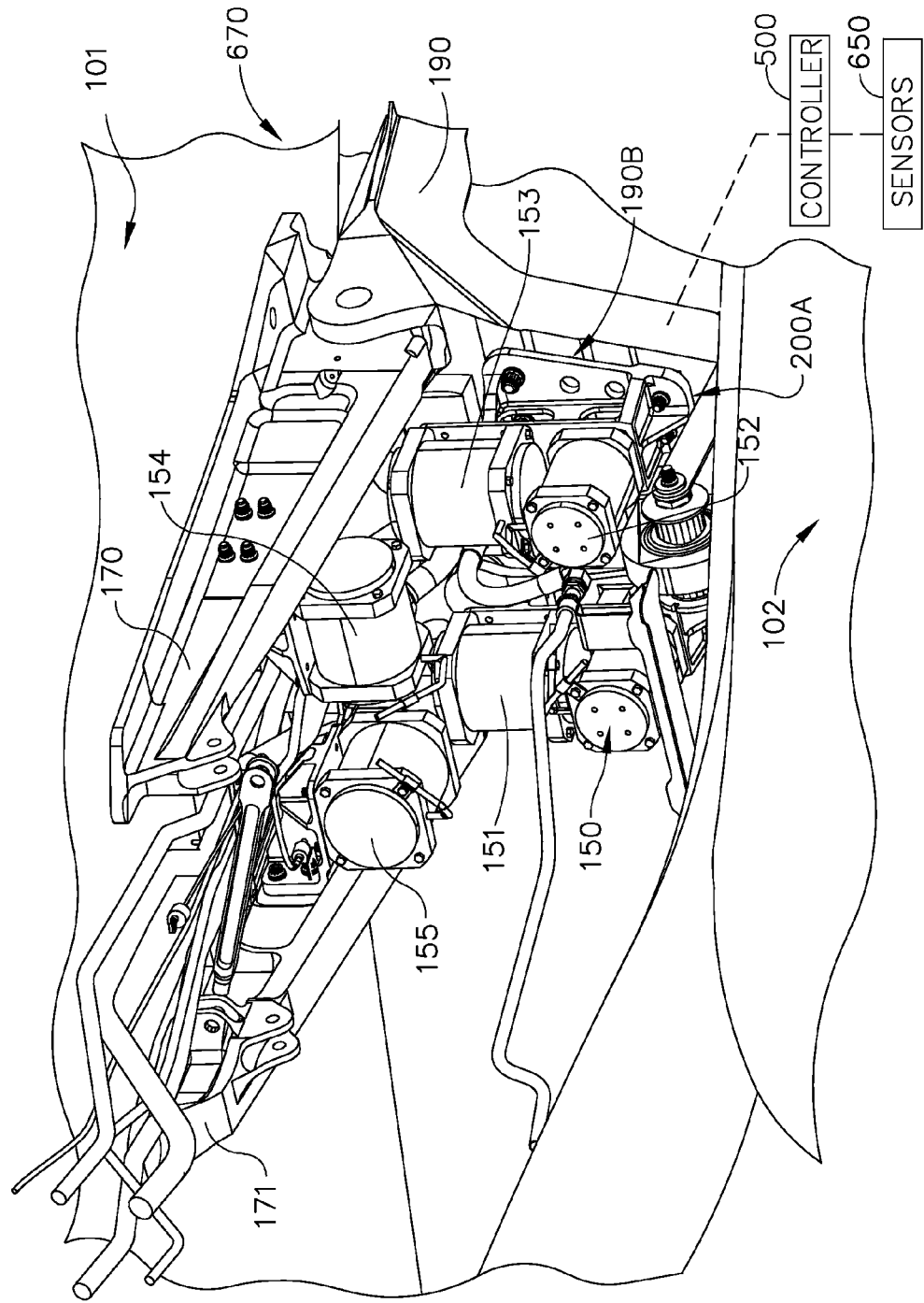
FIGS. 5A and 5B are schematic illustrations of exemplary actuator locations in accordance with aspects of the disclosed embodiment.
Figure 5B:
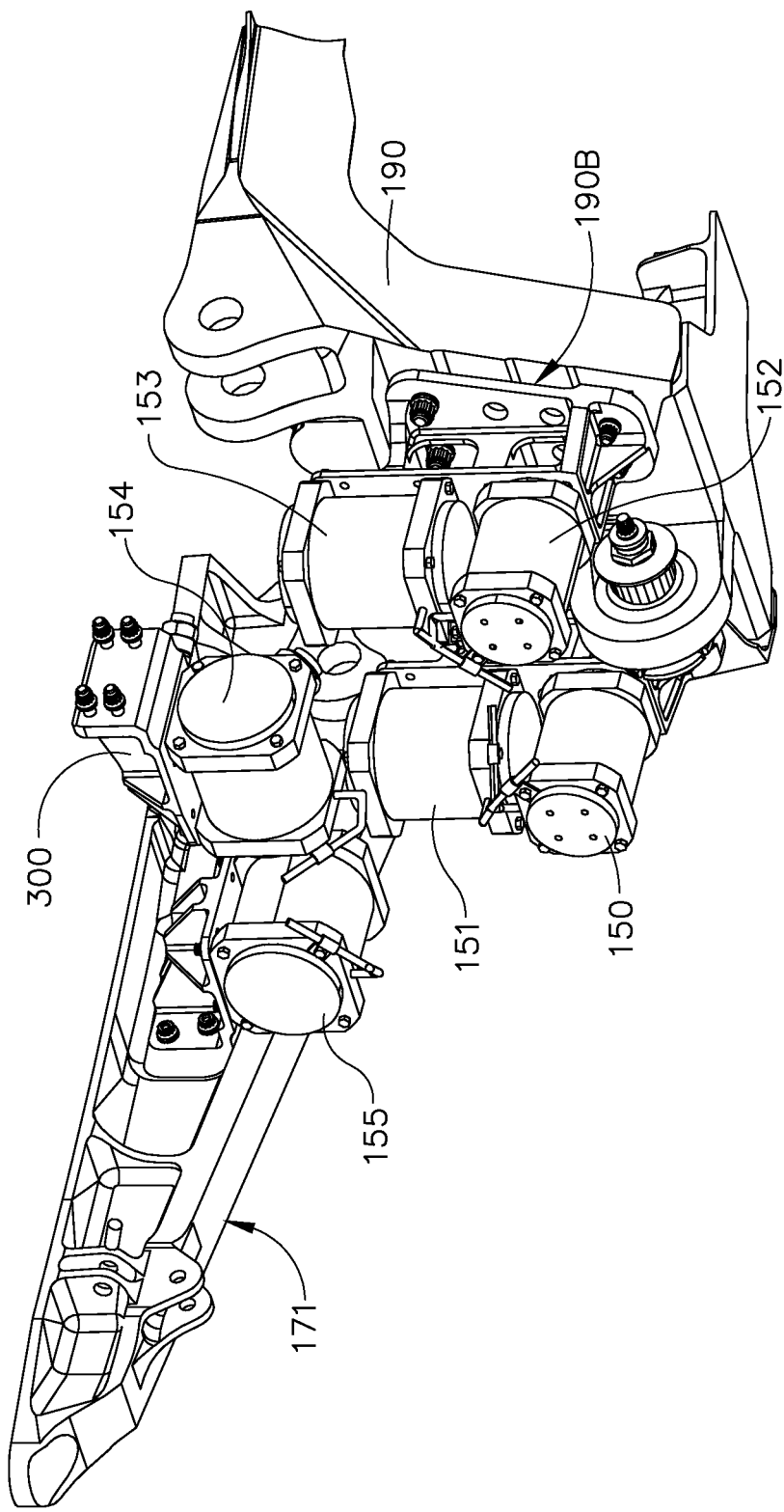

As noted above, referring to FIGS. 5A and 5B, the active vibration control system 110 in accordance with aspects of the disclosed embodiment may be installed in a Boeing 737NG aircraft or any other suitable aircraft. As also noted above, in one aspect the active vibration control system 110 includes a plurality of actuators corresponding to and disposed adjacent each engine 102. For example, in one aspect the plurality of actuators includes no more than two actuators for each engine 102. In another aspect the plurality of actuators includes no more than three actuators for each engine. In still other aspects each engine 102 includes any suitable number of corresponding actuators. In one aspect, for example, there is at least one pair of actuators per engine where one actuator of the pair of actuators is oriented, for example, along an axis that is orthogonal to an axis of the other one of the pair of actuators (in other aspects a third actuator is included and is orientated along a common axis with one actuator of the pair of actuator, or along an axis that is not common with the axes of the pair of actuators). As can be seen in FIGS. 5A and 5B (see also FIG. 1C) the actuators may be disposed on an engine mounting structure such as, for example, the strut 190, the aft bulkhead 190B and/or one or more wing fittings 170, 171 in a manner substantially similar to that described above. As may be realized, in other aspects any suitable actuator mounting brackets may be used to mount the actuators to the engine mounting structure.

As can also be seen in FIGS. 5A and 5B each engine mounting structure may have, for example, six (or any other suitable number of) actuator mounting locations 1-6. Here, location 1 is an aft bulkhead, vertical outboard mounting location; location 2 is an aft bulkhead, vertical inboard mounting location; location is an aft bulkhead fore/aft outboard mounting location; location 4 is an aft bulkhead fore/aft inboard mounting location; location 5 is a wing fitting fore/aft outboard mounting location; and location 6 is a wing fitting lateral inboard mounting location. It is noted that the terms "vertical", "fore/aft" and "lateral" with respect to the actuator mounting locations refer to the directional orientation of the actuator (e.g. the direction in which forces are provided by the actuators). It is also noted that the term "inboard" denotes a closer proximity to the fuselage than the term "outboard". In one aspect, where no more than two actuators are provided, one of the no more than two actuators (e.g. a first actuator), for example, is mounted in location 1 and the other of the no more than two actuators (e.g. a second actuator) is mounted in location 5. In other aspects the no more than two actuators are mounted in any two of the mounting locations 1-6. For example, other suitable actuator location combinations include, but are not limited to all actuator locations 1-6 (e.g. 6 actuators per engine); locations 1, 2 and 5 (e.g. no more than actuators per engine); locations 1, 2, 3, 4 and 5 (no more than 5 actuators per engine); and locations 1, 2, 3 and 5 (no more than 4 actuators per engine).

Figure 6:
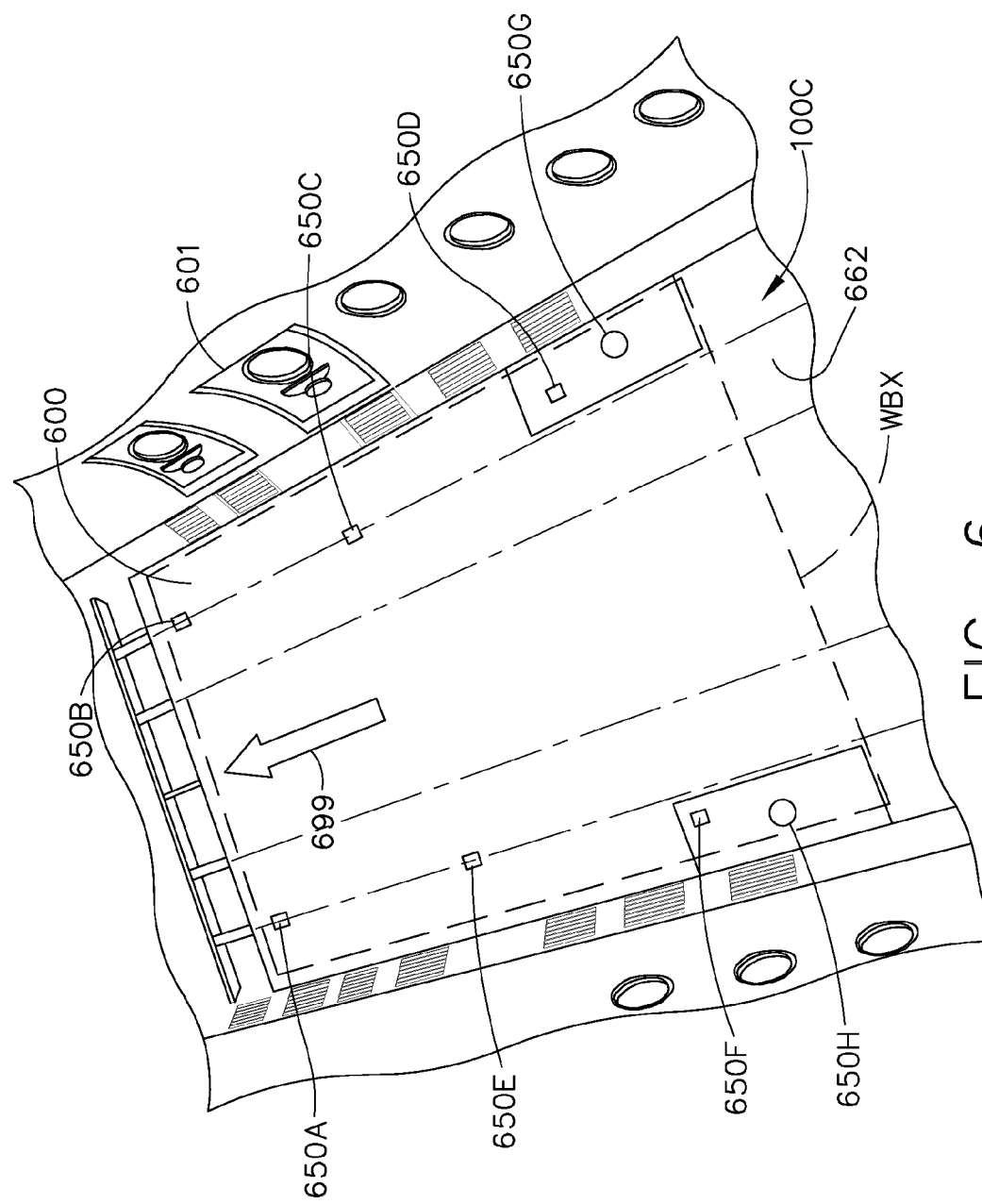
FIG. 6 is a schematic illustration of an exemplary sensor placement in accordance with aspects of the disclosed embodiment.

Referring also to FIGS. 5A and 6, there may be any suitable number of sensors 650 connected to the controller 500 for sensing or otherwise detecting vibration and/or sound of the engines 102. In one aspect the sensors 650 are disposed inside the passenger cabin 100C and/or external to the passenger cabin 100C such as in an inboard portion IWS of the wing 101 (FIG. 1A) and/or on/adjacent to the engine mounting structure (e.g. wing fittings 170, 171 and/or strut 190 or any other suitable member of the engine mounting structure 670). As may be realized, the mounting brackets described above may be employed for mounting the actuators to the aircraft as described herein. In one aspect the sensors 650 may be any suitable type of sensors such as for example, accelerometers 650A-650F, microphones 650G-650H or a combination of accelerometers 650A-650F and microphones 650G-650H.

In one aspect there may be any suitable number of sensors 650 disposed external to the passenger cabin 100C and/or any suitable number of sensors disposed within the passenger cabin 100C. In another aspect the sensors 650 include, for example, accelerometers and/or microphones located only external to the passenger cabin 100C. In still other aspects the sensors 650 include, for example, accelerometers and/or microphones located only within the passenger cabin 100C. In yet another aspect, the sensors include, for example, only accelerometers disposed external to and/or internal to the passenger cabin. In another aspect, the sensors include, for example, only microphones disposed external to and/or internal to the passenger cabin. In one aspect there is at least one sensor 650 per one or more actuators. In another aspect there is at least one sensor 650 per actuator so that there are as many sensors as there are actuators. In other aspects, for example, there are more sensors than there are actuators. For example, there may be about sixteen sensors (accelerometers and/or microphones) disposed within the passenger cabin and/or about sixteen sensors (accelerometers and/or microphones) disposed external to the passenger cabin. As may be realized, any suitable number of sensors may be provided such as for example, two to three sensors (accelerometers and/or microphones) disposed within the cabin 100C near the wing box WBX (FIG. 6). In still other aspects, for example, there are more actuators than sensors 650 such that one or more sensors 650 may be common sensors for two or more actuators.

The sensors 650 are configured to detect the amplitude and/or phase of the vibrations and/or sound generated by the engine(s) 102. The sensors, as noted above, provide feedback to the controller 500 that includes an amplitude and/or phase (and/or frequency—as described below) signal so that the controller 500 can issue control commands to one or more actuators 150-155 for generating or otherwise inputting a vibration or sound into the aircraft structure having an opposite amplitude, phase and/or frequency to that of the vibration or sound generated by a respective engine 102 to effect suppression of the engine 102 vibration and/or sound. In one aspect, an engine tachometer TC (FIG. 1B) may be provided. The tachometer TC may be configured to send signals that include an operational frequency of the engine to the controller 500. In one aspect, the controller 500 may issue commands to the actuators based on the operational frequency obtained by the tachometer and the amplitude and/or phase signals from the sensors 650. In other aspects, sensors 650 may be configured to send signals to the controller 500 that include the amplitude, phase and/or frequency of the vibrations/sound so that the controller 500 may issue control commands to one or more actuators 150-155.

In one aspect, the sensors 650A-650G may be located within the cabin, fore and aft (see arrow 699 indicating the front of the aircraft 100) of and/or in an area within the cabin corresponding to the wing box WBX (e.g. the area at which the wing is coupled to the fuselage of the aircraft 100. Referring to FIG. 6 a portion of the passenger cabin 100C is illustrated that corresponds to an area of the fuselage the wing box WBX is located. As may be realized, any vibrations and/or sound generated by the engines 102 may enter the cabin through the connection between the wings 101 and the fuselage (e.g. the wing box WBX). Here the wing box WBX is located on the bottom of the aircraft 100 below the cabin floor 662 such that the sensors 650A-650G are located on or substantially within the cabin floor 662. As may be realized, the sensors 650A-650G may be located on seat posts, in or on the cabin walls 601, on a surface 600 of the cabin floor 662 or any other suitable location within the cabin 100C. In other aspects, where the wing box WBX is located on the top of the aircraft, above the cabin ceiling (not shown) the sensors 650A-650G may be located in or on the cabin ceiling or at any other suitable location within the cabin.

Figure 7A:
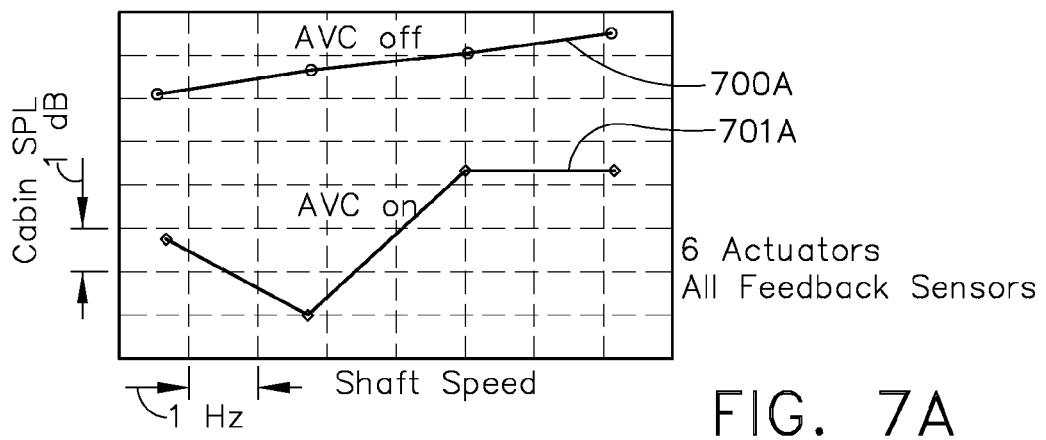
FIGS. 7A-7C are exemplary graphs of sound reduction for a sensor and actuator combination in accordance with aspects of the disclosed embodiment.
Figure 7B:
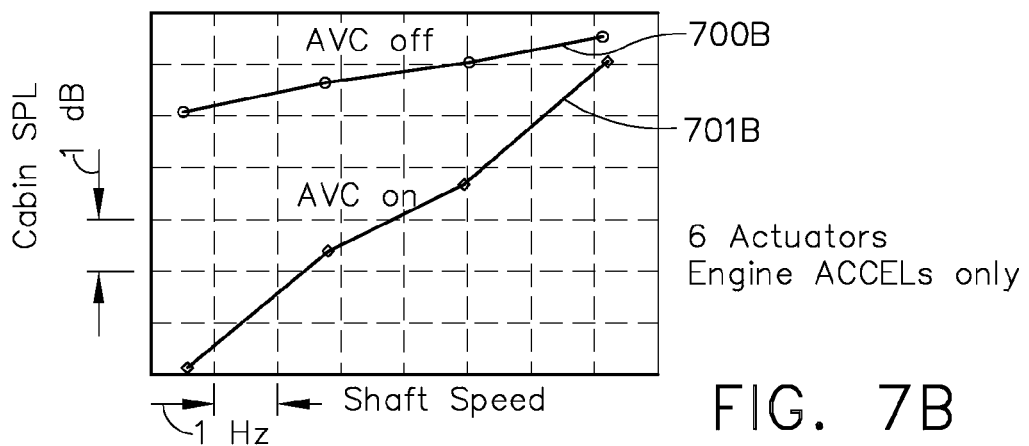
Figure 7C:
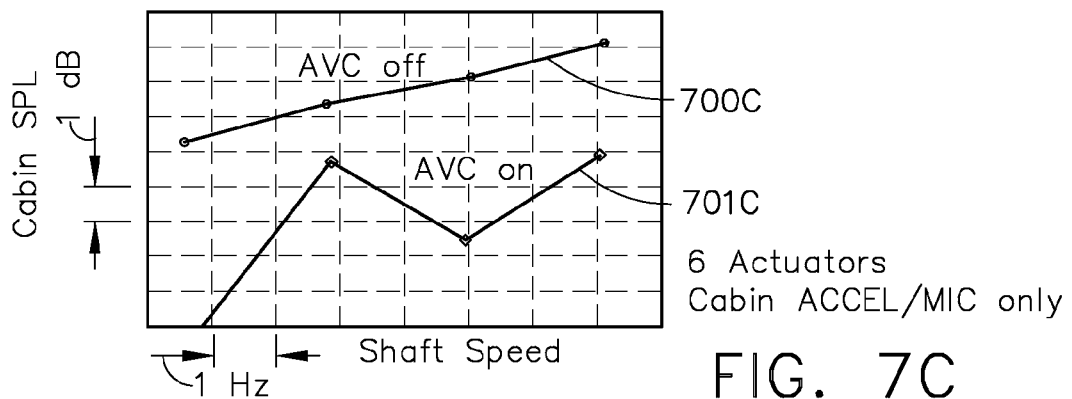

Referring now to FIGS. 7A-7C, exemplary sound reduction charts (sound pressure level from microphones versus engine shaft speed (Hz)) for the N1 spool are illustrated where the (six) actuators 150-155 (in locations 1-6) are employed by the controller 500 to suppress engine 102 vibration/sound. FIG. 7A illustrates vibration/sound suppression effected by the controller 500 and actuators 150-155 with feedback from, for example, about sixteen sensors 650 located within the cabin 100C and about sixteen sensors located external to the cabin 100C. FIG. 7B illustrates vibration/sound suppression effected by the controller 500 and actuators 150-155 with feedback from, for example, about sixteen sensors 650 (e.g. accelerometers) located external to the cabin 100C. FIG. 7C illustrates vibration/sound suppression effected by the controller 500 and actuators 150-155 with feedback from, for example, about sixteen sensors 650 (e.g. a combination of accelerometers and microphones) located within the cabin 100C. Lines 700A, 700B, 700C represent engine sound within the cabin 100C without active vibration control while lines 701A, 701B, 701C represent engine sound within the cabin 100C with active vibration control.

Figure 8A:
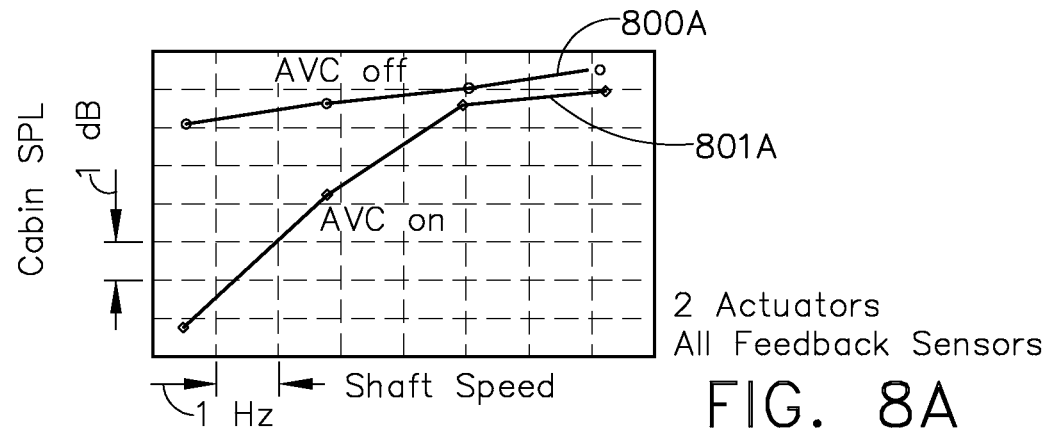
Figure 8B:
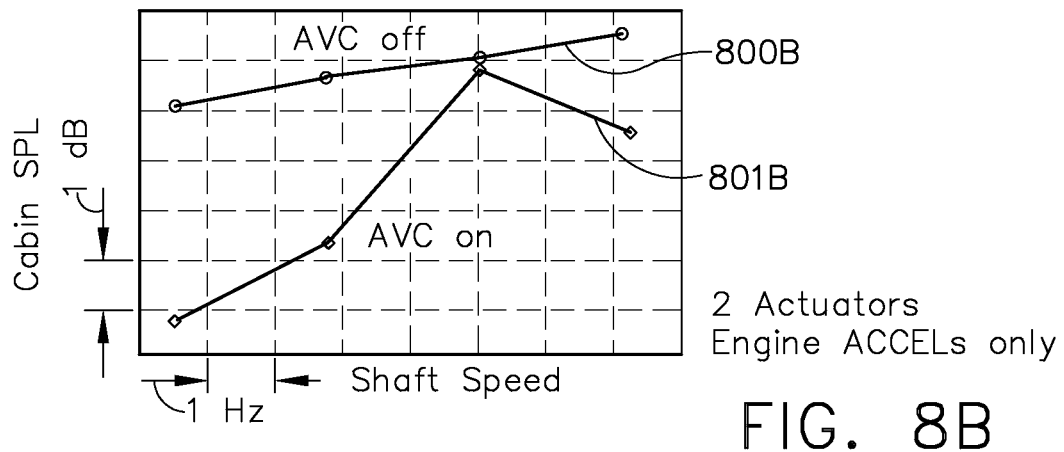
Figure 8C:
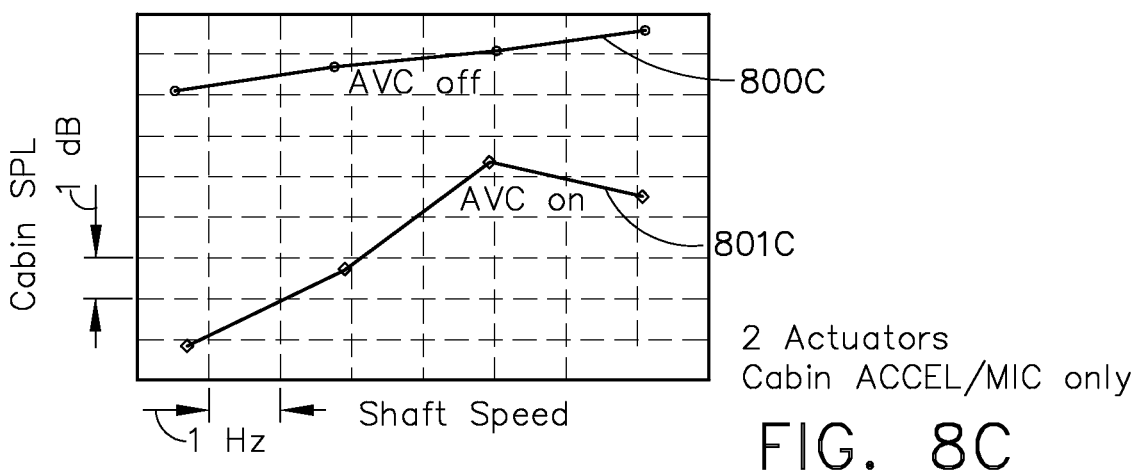

FIGS. 8A-8C illustrate exemplary sound reduction charts (sound pressure level from microphones versus engine shaft speed (Hz)) for the N1 spool where actuators 151, 155 (in locations 1 and 5) are employed by the controller 500 to suppress engine 102 vibration/sound. FIG. 8A illustrates vibration/sound suppression effected by the controller and actuators with feedback from, for example, about sixteen sensors 650 located within the cabin 100C and about sixteen sensors located external to the cabin 100C. FIG. 8B illustrates vibration/sound suppression effected by the controller 500 and actuators 151, 155 with feedback from, for example, about sixteen sensors 650 (e.g. accelerometers) located external to the cabin 100C. FIG. 8C illustrates vibration/sound suppression effected by the controller 500 and actuators 151, 155 with feedback from, for example, about sixteen sensors 650 (e.g. a combination of accelerometers and microphones) located within the cabin 100C. Lines 800A, 800B, 800C represent engine sound within the cabin 100C without active vibration control while lines 801A, 801B, 801C represent engine sound within the cabin 100C with active vibration control.

Figure 9A:
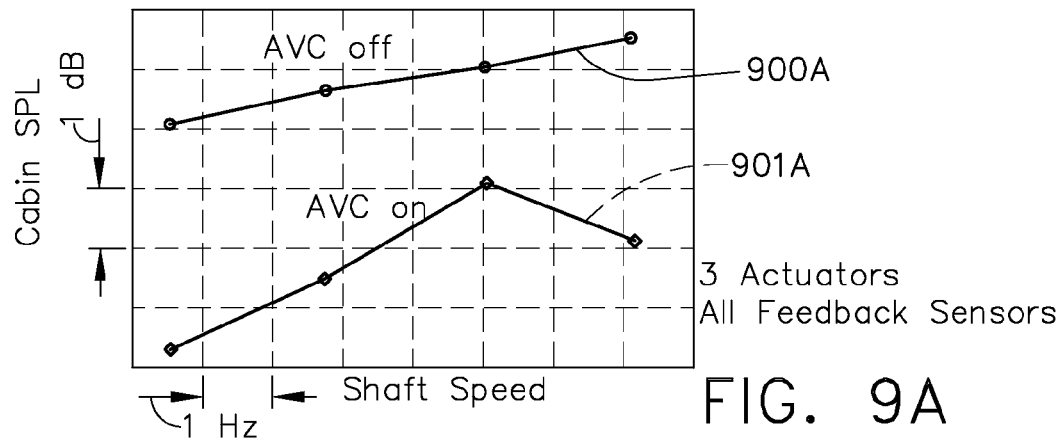
Figure 9B:
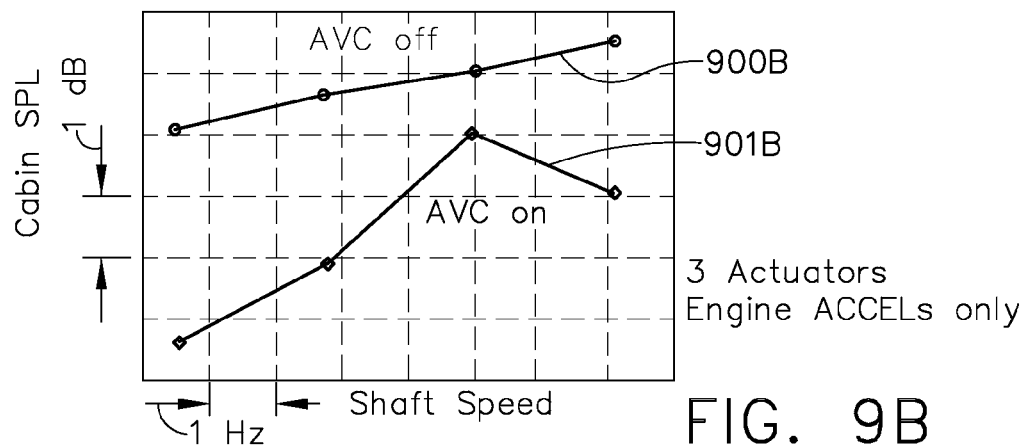
Figure 9C:
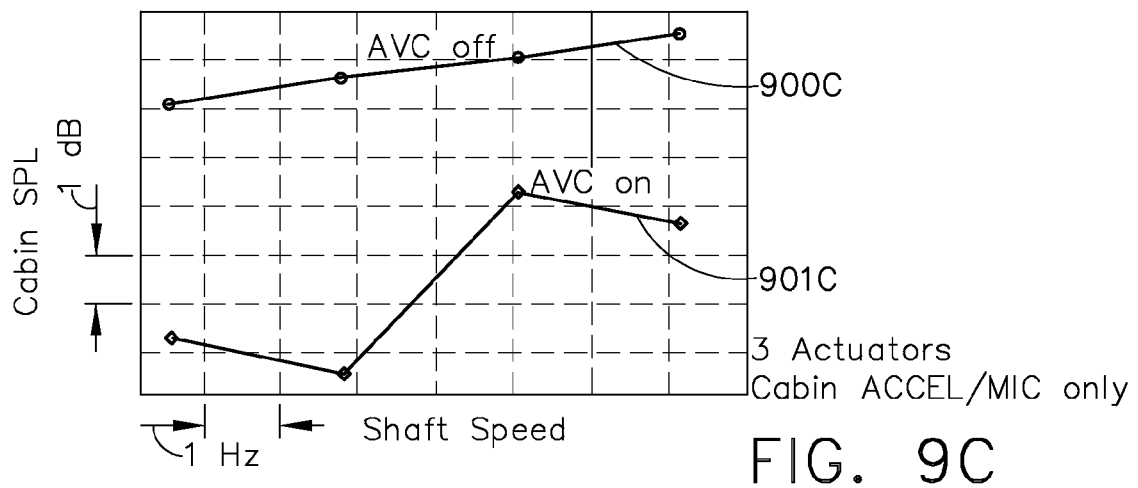

FIGS. 9A-9C illustrate exemplary sound reduction charts (sound pressure level from microphones versus engine shaft speed (Hz)) for the N1 spool where actuators 151, 153, 155 (in locations 1, 2 and 5) are employed by the controller 500 to suppress engine 102 vibration/sound. FIG. 9A illustrates vibration/sound suppression effected by the controller 500 and actuators 151, 153, 155 with feedback from, for example, about sixteen sensors 650 located within the cabin 100C and about sixteen sensors located external to the cabin 100C. FIG. 9B illustrates vibration/sound suppression effected by the controller 500 and actuators 151, 153, 155 with feedback from, for example, about sixteen sensors 650 (e.g. accelerometers) located external to the cabin 100C. FIG. 9C illustrates vibration/sound suppression effected by the controller 500 and actuators 151, 153, 155 with feedback from, for example, about sixteen sensors 650 (e.g. a combination of accelerometers and microphones) located within the cabin 100C. Lines 900A, 900B, 900C represent engine sound within the cabin 100C without active vibration control while lines 901A, 901B, 901C represent engine sound within the cabin 100C with active vibration control.

As can be seen from FIGS. 7A-9C N1 sound reduction of up to about 10 dB or more may be attained with the active vibration control system described herein. As may be realized, similar sound/vibration reductions may be effected with the controller 500, sensors 650 and two or more actuators 150-155 for sound/vibration generated by the N2 and N3 spools (where equipped) in a manner similar to that described herein.

In one aspect sound and vibration within a passenger cabin 100C of an aircraft 100 is reduced or suppressed with active vibration control by providing the feedback signals (described above) to the controller 500 with one or more sensors 650 (FIG. 10, Block 1000). In one aspect, the controller 500 actuates no more than two of a plurality of actuators 150-155 for each engine 102 based on the feedback signal to effect suppression of one or more of sound and vibration generated by a respective engine 102 (FIG. 10, Block 1001). For example, the controller issues commands to the actuators so that the actuators generate controlled forces that are input to the aircraft structure to suppress the vibration and/or sound generated by the engine(s). In one aspect, as noted above, the feedback signal may be provided by the one or more sensors from one or more of within the passenger cabin of the aircraft, and outside the passenger cabin of the aircraft adjacent the respective engine). IN other aspects, more than two actuators may be actuated by the controller. In one aspect the plurality of actuators 150-155, the one or more sensors 650 and the controller are interconnected with wires or any other suitable communication medium (e.g. wired and/or wireless).

The active vibration control system 110 in accordance with the aspects of the disclosed embodiment effect improved ride comfort and/or improved engine balance operations by reducing noise and tactile vibration caused by engines of an aircraft. As described herein the active vibration control is effected through a control of input forces (generated by actuators 150, 151, 152, 153, 154, 155), to the structure or frame of the aircraft to suppress the vibration and/or noise/sound (independent of improvements to the engine by the engine manufacturer) while minimizing a complexity, a size and a weight of the active vibration control system (e.g. minimized number of actuators and associated wiring and sensors).

In accordance with one or more aspects of the disclosed embodiment an active vibration control actuator mount includes at least one actuator bracket having an actuator interface member configured to hold one or more active vibration element thereon in one or more predetermined orientations, and an engine mounting structure interface member connected to the actuator interface member, the engine mounting structure interface member being configured to couple the at least one actuator bracket to an engine mounting structure; wherein the at least one actuator bracket is configured for the installation and removal of a respective active vibration element to and from the actuator interface member while a respective one of the at least one actuator bracket remains coupled to the engine mounting structure.

In accordance with one or more aspects of the disclosed embodiment the actuator interface member and the engine mounting structure interface member are arranged at a non-zero angle relative to each other.

In accordance with one or more aspects of the disclosed embodiment the actuator interface member and the engine mounting structure interface member are arranged substantially parallel relative to each other.

In accordance with one or more aspects of the disclosed embodiment the actuator interface member and the engine mounting structure interface member of a first one of the at least one actuator bracket are arranged at a non-zero angle relative to each other.

In accordance with one or more aspects of the disclosed embodiment the actuator interface member and the engine mounting structure interface member of a second one of the at least one actuator bracket are arranged substantially parallel relative to each other.

In accordance with one or more aspects of the disclosed embodiment the at least one actuator bracket is dynamically tuned so that a first modal frequency of the at least one actuator bracket is outside an operational frequency of a respective active vibration element mounted to the at least one actuator bracket.

In accordance with one or more aspects of the disclosed embodiment the at least one actuator bracket includes apertures configured such that tools are inserted through the apertures for one or more of installing and removing a respective active vibration element mounted to the at least one actuator bracket.

In accordance with one or more aspects of the disclosed embodiment the at least one actuator bracket is configured to couple to the engine mounting structure of a Boeing 737 using preexisting fastener holes of the engine mounting structure.

In accordance with one or more aspects of the disclosed embodiment the at least one actuator bracket is configured to couple to the engine mounting structure with minimal modification to the engine mounting structure.

In accordance with one or more aspects of the disclosed embodiment a method for mounting active vibration control actuators to an engine mounting structure includes providing at least one actuator bracket; providing an actuator interface member on the at least one actuator bracket for holding one or more active vibration elements thereon in one or more predetermined orientations; and providing an engine mounting structure interface member on the at least one actuator bracket and connected to the actuator interface member for coupling the at least one actuator bracket to an engine mounting structure; wherein the at least one actuator bracket provides for the installation and removal of the one or more active vibration elements from the actuator interface member while a respective one of the at least one actuator bracket remains coupled to the engine mounting structure.

In accordance with one or more aspects of the disclosed embodiment the actuator interface member and the engine mounting structure interface member of a first one of the at least one actuator bracket are arranged at a non-zero angle relative to each other.

In accordance with one or more aspects of the disclosed embodiment the actuator interface member and the engine mounting structure interface member of a second one of the at least one actuator bracket are arranged substantially parallel relative to each other.

In accordance with one or more aspects of the disclosed embodiment the method further includes dynamically tuning the at least one actuator bracket so that a first modal frequency of the at least one actuator bracket is outside an operational frequency of a respective active vibration element mounted to the at least one actuator bracket.

In accordance with one or more aspects of the disclosed embodiment the method further includes providing the at least one actuator bracket with apertures through which tools are inserted for one or more of installing and removing a respective active vibration element mounted to the at least one actuator bracket.

In accordance with one or more aspects of the disclosed embodiment the engine mounting structure is of a Boeing 737 and coupling the at least one actuator bracket to the engine mounting structure comprises using preexisting fastener holes of the engine mounting structure.

In accordance with one or more aspects of the disclosed embodiment coupling the at least one actuator bracket to the engine mounting structure comprises coupling the at least one actuator bracket to the engine mounting structure with minimal modification to the engine mounting structure.

In accordance with one or more aspects of the disclosed embodiment the method further includes providing at least one additional actuator bracket so that at least one additional active vibration element is mounted to the engine mounting structure in an orientation that is common to or different than the one or more predetermined orientations.

In accordance with one or more aspects of the disclosed embodiment an active vibration control actuator mount includes a first actuator bracket having an actuator interface member configured to hold one or more active vibration element thereon in one or more predetermined orientation, and an engine mounting structure interface member connected to the actuator interface member, the engine mounting structure interface member being configured to couple the at least one actuator bracket to a first mounting location of an engine mounting structure; a second actuator bracket having an actuator interface member configured to hold one or more active vibration element thereon in one or more predetermined orientation, and an engine mounting structure interface member connected to the actuator interface member, the engine mounting structure interface member being configured to couple the at least one actuator bracket to a second mounting location of an engine mounting structure distinct from the first mounting location; wherein each of the first actuator bracket and the second actuator bracket are configured for the installation and removal of a respective active vibration element to and from the actuator interface member while a respective one of the first actuator bracket and second actuator bracket remains coupled to the engine mounting structure.

In accordance with one or more aspects of the disclosed embodiment the one or more predetermined orientation of the first actuator bracket and the one or more predetermined orientation of the second actuator bracket include at least one common orientation.

In accordance with one or more aspects of the disclosed embodiment the one or more predetermined orientation of the first actuator bracket and the one or more predetermined orientation of the second actuator bracket include at least one different orientation.

In accordance with one or more aspects of the disclosed embodiment the first actuator bracket and the second actuator bracket are configured to couple to the engine mounting structure of a Boeing 737 using preexisting fastener holes of the engine mounting structure with minimal modification to the engine mounting structure.

In accordance with one or more aspects of the disclosed embodiment an active vibration actuator bracket mounting system includes more than one actuator bracket, each actuator bracket including an actuator interface member configured to hold one or more active vibration element thereon in one or more predetermined orientations, an engine mounting structure interface member connected to the actuator interface member, the engine mounting structure interface member being configured to couple the at least one actuator bracket to an engine mounting structure, and each actuator bracket being configured to mount in a predetermined location of an aircraft engine mounting structure and hold at least one active vibration element in a predetermined orientation; wherein at least one bracket is selected from the more than one brackets for placement in the predetermined location of the aircraft engine mounting structure where placement of the at least one bracket in a respective predetermined location effects at least reduction of an aircraft engine vibration along at least one axis of the aircraft.

In accordance with one or more aspects of the disclosed embodiment each actuator bracket is configured for the installation and removal of a respective active vibration element to and from the actuator interface member while a respective one of the at least one actuator bracket remains coupled to the engine mounting structure.

In accordance with one or more aspects of the disclosed embodiment the actuator interface member and the engine mounting structure interface member are arranged at a non-zero angle relative to each other.

In accordance with one or more aspects of the disclosed embodiment the actuator interface member and the engine mounting structure interface member are arranged substantially parallel relative to each other.

In accordance with one or more aspects of the disclosed embodiment the actuator interface member and the engine mounting structure interface member of a first one of the more than one actuator bracket are arranged at a non-zero angle relative to each other, and the actuator interface member and the engine mounting structure interface member of a second one of the more than one actuator bracket are arranged substantially parallel relative to each other.

In accordance with one or more aspects of the disclosed embodiment each actuator bracket is dynamically tuned so that a first modal frequency of each actuator bracket is outside an operational frequency of a respective active vibration element mounted to a respective actuator bracket.

In accordance with one or more aspects of the disclosed embodiment at least one actuator bracket includes apertures configured such that tools are inserted through the apertures for one or more of installing and removing a respective active vibration element mounted to the at least one actuator bracket.

In accordance with one or more aspects of the disclosed embodiment each actuator bracket is configured to couple to the engine mounting structure of a Boeing 737 using preexisting fastener holes of the engine mounting structure.

In accordance with one or more aspects of the disclosed embodiment each actuator bracket is configured to couple to the engine mounting structure with minimal modification to the engine mounting structure.

In accordance with one or more aspects of the disclosed embodiment an active vibration control system includes a plurality of actuators corresponding to and disposed adjacent each engine of an aircraft; at least one sensor corresponding to one or more of the plurality of actuators, each of the at least one sensor effecting a generation of one or more of a vibration and sound feedback signal corresponding to a respective one or more of the plurality of actuators; and a controller connected to each of the plurality of actuators and each of the at least one sensor, the controller being configured to effect control of no more than two of the plurality of actuators for a respective engine based the feedback signal where the no more than two actuators effect suppression of one or more of vibration and sound of a respective engine due to a rotating axis of the respective engine.

In accordance with one or more aspects of the disclosed embodiment the aircraft is a Boeing 737NG.

In accordance with one or more aspects of the disclosed embodiment the at least one sensor is disposed within the passenger cabin of the aircraft and outside the passenger cabin of the aircraft adjacent a respective engine.

In accordance with one or more aspects of the disclosed embodiment the plurality of actuators comprises no more than two actuators.

In accordance with one or more aspects of the disclosed embodiment the active vibration control system further includes wiring for interconnecting the plurality of actuators, the at least one sensor and the controller.

In accordance with one or more aspects of the disclosed embodiment the at least one sensor comprises one or more of an accelerometer and a microphone.

In accordance with one or more aspects of the disclosed embodiment one of the no more than two actuators is disposed on a vertical outboard portion of an engine mount aft bulkhead for the respective engine and the other one of the no more than two actuators is disposed on a wing fitting of the engine mount for the respective engine.

In accordance with one or more aspects of the disclosed embodiment the feedback signal comprises indication of one or more of an amplitude and frequency of one or more of engine vibration and sound.

In accordance with one or more aspects of the disclosed embodiment a method for reducing one or more of sound and vibration in the passenger cabin of an aircraft having at least one engine is provided. The method includes providing feedback signals to a controller with one or more sensors located within the passenger cabin; and actuating, with the controller, no more than two of a plurality actuators for each engine based on the feedback signal to effect suppression of one or more of the sound and vibration generated by a respective engine.

In accordance with one or more aspects of the disclosed embodiment the aircraft is a Boeing 737NG.

In accordance with one or more aspects of the disclosed embodiment the method further includes providing feedback signals from the one or more sensors within the passenger cabin of the aircraft and one or more sensors outside the passenger cabin of the aircraft adjacent the respective engine.

In accordance with one or more aspects of the disclosed embodiment the method further includes interconnecting the plurality of actuators, the one or more sensors and the controller with wiring.

In accordance with one or more aspects of the disclosed embodiment the method further includes providing the feedback signals with one or more of an accelerometer and a microphone.

In accordance with one or more aspects of the disclosed embodiment the method further includes positioning the no more than two of the plurality of actuators on a vertical outboard portion of an engine mount aft bulkhead for the respective engine and positioning the other one of the no more than two actuators is disposed on a wing fitting of the engine mount for the respective engine.

In accordance with one or more aspects of the disclosed embodiment the method further includes providing an indication of one or more of an amplitude, phase and frequency of one or more of engine vibrations and sound within the feedback signal.

In accordance with one or more aspects of the disclosed embodiment an active vibration control system includes a first actuator and a second actuator disposed on each engine mounting structure of a 737NG aircraft; at least one sensor corresponding to one or more of the first actuator and the second actuator, each of the at least one sensor being configured to detect at least a magnitude and frequency of engine vibrations and being disposed within a passenger cabin of the aircraft, and outside the passenger cabin of the aircraft adjacent a respective engine; and a controller connected to the at least one sensor, the first actuator and the second actuator, where the controller is configured to effect control of the first and second actuator based on feedback signals from the at least one sensor, and suppression of one or more of engine sound and engine vibration.

In accordance with one or more aspects of the disclosed embodiment the active vibration control system includes no more than the first actuator and the second actuator disposed on each engine mounting structure.

In accordance with one or more aspects of the disclosed embodiment the active vibration control system further includes wiring for interconnecting the first and second actuators, the at least one sensor and the controller.

In accordance with one or more aspects of the disclosed embodiment the at least one sensor comprises one or more of an accelerometer and a microphone.

In accordance with one or more aspects of the disclosed embodiment one of the first actuator and the second actuator is disposed on a vertical outboard portion of the engine mounting structure aft bulkhead for the respective engine and the other one of the first actuator and the second actuator is disposed on a wing fitting of the engine mounting structure for the respective engine.

In accordance with one or more aspects of the disclosed embodiment a Boeing 737NG active vibration control system includes a first and second actuator configured to interface with a Boeing 737NG frame adjacent each engine; at least one sensor arranged within a cabin of the Boeing 737NG and configured to generate feedback signals from sensing excitations of the Boeing 737NG frame; and a controller configured to command operation of the first and second actuator in response to the feedback signal, where operation of the actuators suppresses vibrations and sounds produced by each engine.

In accordance with one or more aspects of the disclosed embodiment the first and second actuators comprises no more than two actuators.

In accordance with one or more aspects of the disclosed embodiment the Boeing 737NG active vibration control system further includes wiring for interconnecting the first and second actuators, the at least one sensor and the controller.

In accordance with one or more aspects of the disclosed embodiment the at least one sensor comprises one or more of an accelerometer and a microphone.

In accordance with one or more aspects of the disclosed embodiment one of the first and second actuators is disposed on a vertical outboard portion of an engine mount aft bulkhead for the respective engine and the other one of the first and second actuators is disposed on a wing fitting of the engine mount for the respective engine.

In accordance with one or more aspects of the disclosed embodiment the feedback signal comprises indication of one or more of an amplitude and frequency of one or more of engine vibration and sound.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. An active vibration control system comprising:
a plurality of actuators corresponding to and disposed adjacent each engine of an aircraft;
at least one sensor located within a passenger cabin of the aircraft and configured to detect a magnitude and frequency of one or more of vibration and sound produced by a respective engine and generate one or more of a vibration and sound feedback signal; and
a controller connected to each of the plurality of actuators and each of the at least one sensor, the controller being configured to effect control of no more than two of the plurality of actuators for a respective engine based the feedback signal where the no more than two actuators effect suppression of one or more of vibration and sound of a respective engine due to a rotating axis of the respective engine.

2. The active vibration control system of claim 1, wherein the aircraft is a Boeing 737NG.

3. The active vibration control system of claim 1, wherein the at least one sensor is disposed within a passenger cabin of the aircraft and outside the passenger cabin of the aircraft adjacent a respective engine.

4. The active vibration control system of claim 1, wherein the plurality of actuators comprises no more than two actuators.

5. The active vibration control system of claim 1, further comprising wiring for interconnecting the plurality of actuators, the at least one sensor and the controller.

6. The active vibration control system of claim 1, wherein the at least one sensor comprises one or more of an accelerometer and a microphone.

7. The active vibration control system of claim 1, wherein one of the no more than two actuators is disposed on a vertical outboard portion of an engine mount aft bulkhead for the respective engine and the other one of the no more than two actuators is disposed on a wing fitting of the engine mount for the respective engine.

8. The active vibration control system of claim 1, wherein the feedback signal comprises indication of one or more of an amplitude and frequency of one or more of engine vibration and sound.

9. A method for reducing one or more of sound and vibration in a passenger cabin of an aircraft having at least one engine, the method comprising:
providing feedback signals to a controller with one or more sensors located within the passenger cabin; and
actuating, with the controller, no more than two of a plurality actuators for each engine based on the feedback signal to effect suppression of one or more of the sound and vibration generated by a respective engine.

10. The method of claim 9, wherein the aircraft is a Boeing 737NG.

11. The method of claim 9, further comprising providing feedback signals from the one or more sensors from within the passenger cabin of the aircraft and outside the passenger cabin of the aircraft adjacent the respective engine.

12. The method of claim 9, further comprising interconnecting the plurality of actuators, the one or more sensors and the controller with wiring.

13. The method of claim 9, further comprising providing the feedback signals with one or more of an accelerometer and a microphone.

14. The method of claim 9, further comprising positioning the no more than two of the plurality of actuators on a vertical outboard portion of an engine mount aft bulkhead for the respective engine and positioning the other one of the no more than two actuators is disposed on a wing fitting of the engine mount for the respective engine.

15. The method of claim 9, further comprising providing an indication of one or more of an amplitude, phase and frequency of one or more of engine vibrations and sound within the feedback signal.

16. A Boeing 737NG active vibration control system comprising:
a first and second actuator configured to interface with a Boeing 737NG frame adjacent each engine;
at least one sensor arranged within a cabin of the Boeing 737NG and configured to generate feedback signals from sensing excitations of the Boeing 737NG frame; and a controller configured to command operation of the first and second actuator in response to the feedback signal, where operation of the actuators suppresses vibrations and sounds produced by each engine.

17. The Boeing 737NG active vibration control system of claim 16, wherein the first and second actuators comprises no more than two actuators.

18. The Boeing 737NG active vibration control system of claim 16, wherein the at least one sensor comprises one or more of an accelerometer and a microphone.

19. The Boeing 737NG active vibration control system of claim 16, wherein one of the first and second actuators is disposed on a vertical outboard portion of an engine mount aft bulkhead for the respective engine and the other one of the first and second actuators is disposed on a wing fitting of the engine mount for the respective engine.

20. The Boeing 737NG active vibration control system of claim 16, wherein the feedback signal comprises indication of one or more of an amplitude and frequency of one or more of engine vibration and sound.

* * * * *